(12) United States Patent  
Sakurai et al.

(10) Patent No.: US 10,222,194 B2  
(45) Date of Patent: Mar. 5, 2019

(54) ORIENTATION DETECTION DEVICE, ORIENTATION DETECTION METHOD AND PROGRAM STORAGE MEDIUM

(71) Applicant: CASIO COMPUTER CO., LTD., Tokyo (JP)

(72) Inventors: Keiichi Sakurai, Akishima (JP); Ryutaro Hayashi, Hamura (JP); Yuji Tabata, Ome (JP); Kazutaka Kasuga, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 867 days.

(21) Appl. No.: 13/853,781

(22) Filed: Mar. 29, 2013

(65) Prior Publication Data

US 2013/0262024 A1    Oct. 3, 2013

(30) Foreign Application Priority Data

Apr. 2, 2012 (JP) ................................ 2012-084369

(51) Int. Cl.
  *G01B 7/14* (2006.01)
  *G10H 1/00* (2006.01)
(52) U.S. Cl.
  CPC .............. *G01B 7/14* (2013.01); *G10H 1/0008* (2013.01); *G10H 2220/185* (2013.01);
  (Continued)
(58) Field of Classification Search
  CPC .......... G10H 1/0008; G10H 2230/281; G10H 2220/185; G10H 2220/395; G10H 2220/401; G10H 2220/391
  See application file for complete search history.

(56) References Cited

U.S. PATENT DOCUMENTS 6,388,183 B1   5/2002  Leh
7,474,197 B2   1/2009  Choi et al.
(Continued)

FOREIGN PATENT DOCUMENTS

EP    1 583 073 A1   10/2005
EP    1 686 778 A1    8/2006
(Continued)

OTHER PUBLICATIONS

European Search Report (EESR) dated Aug. 7, 2013 (in English) issued in counterpart European Application No. 13162008.0.
(Continued)

*Primary Examiner* — Mohamed Charioui
*Assistant Examiner* — Jeremy Delozier
(74) *Attorney, Agent, or Firm* — Holtz, Holtz & Volek PC

(57) ABSTRACT

In the preset invention, in an initial stationary state of a drumstick section, a CPU stores each axis component of geomagnetism obtained by a magnetic sensor in a RAM, and obtains each axis component of geomagnetism obtained by the magnetic sensor which is changed by a motion provided to the drumstick section at every predetermined timing. Then, the CPU accumulates each axis component of geomagnetism obtained at every predetermined timing, for each predetermined interval, and conforms each axis component of geomagnetism accumulated thereby to each axis component of geomagnetism stored in the RAM.

14 Claims, 18 Drawing Sheets

(52) U.S. Cl.
CPC . *G10H 2220/391* (2013.01); *G10H 2220/395* (2013.01); *G10H 2220/401* (2013.01); *G10H 2230/281* (2013.01)

(56) References Cited

U.S. PATENT DOCUMENTS

| | | |
|---|---|---|
| 2001/0015123 A1 | 8/2001 | Nishitani et al. |
| 2005/0213476 A1 | 9/2005 | Choi et al. |
| 2006/0170562 A1 | 8/2006 | Choi et al. |
| 2007/0000374 A1 | 1/2007 | Clark et al. |
| 2007/0255434 A1 | 11/2007 | Inagaki |
| 2009/0209344 A1 | 8/2009 | Okamura |
| 2009/0216483 A1 | 8/2009 | Young |
| 2009/0325703 A1 | 12/2009 | Suzuki et al. |
| 2010/0009746 A1 | 1/2010 | Raymond et al. |
| 2010/0156785 A1 | 6/2010 | Nakaoka |
| 2010/0263518 A1 | 10/2010 | Nishitani et al. |
| 2011/0290097 A1 | 12/2011 | Takahashi et al. |
| 2012/0024128 A1* | 2/2012 | Takahashi ............ G10H 1/0008 84/600 |
| 2012/0059494 A1 | 3/2012 | David |
| 2012/0070137 A1 | 3/2012 | Watanabe |
| 2012/0231883 A1* | 9/2012 | Hayashi .................. A63F 13/20 463/31 |
| 2012/0266739 A1 | 10/2012 | Tsuji |
| 2013/0255476 A1* | 10/2013 | Sakurai ................... G10H 5/00 84/723 |

FOREIGN PATENT DOCUMENTS

| | | |
|---|---|---|
| JP | 11085387 A | 3/1999 |
| JP | 2007-256736 A | 10/2007 |
| JP | 2010263930 A | 11/2010 |
| WO | 2008026357 A1 | 3/2008 |

OTHER PUBLICATIONS

"Wii MotionPlus", Wikipedia.org, URL: https://en.wikipedia.org/w/index.php?title=Wii_MotionPlus&oldid=482109037, Sections: "Technology and Features" and "Development", Five Pages (in English).

Sawada H. et al., "Gesture Recognition Using an Acceleration Sensor and its Application to Musical Performance Control", Electronics & Communications in Japan, Part 3, vol. 80, No. 5, May 1997, Fundamental Electronic Science, pp. 9-17 (in English).

U.S. Appl. No. 13/854,686; First Named Inventor: Keiichi Sakurai; Title: "Playing Apparatus, Method, and Program Recording Medium"; filed Apr. 1, 2013.

U.S. Appl. No. 13/853,729; First Named Inventor: Keiichi Sakurai; Title: "Orientation Detection Device, Orientation Detection Method and Program Storage Medium"; filed Mar. 29, 2013.

Japanese Office Action dated Mar. 13, 2018 issued in counterpart Japanese Application No. 2016-252883.

Japanese Office Action dated Nov. 6, 2018 (and English translation thereof) issued in Japanese Application No. 2016-252883.

\* cited by examiner

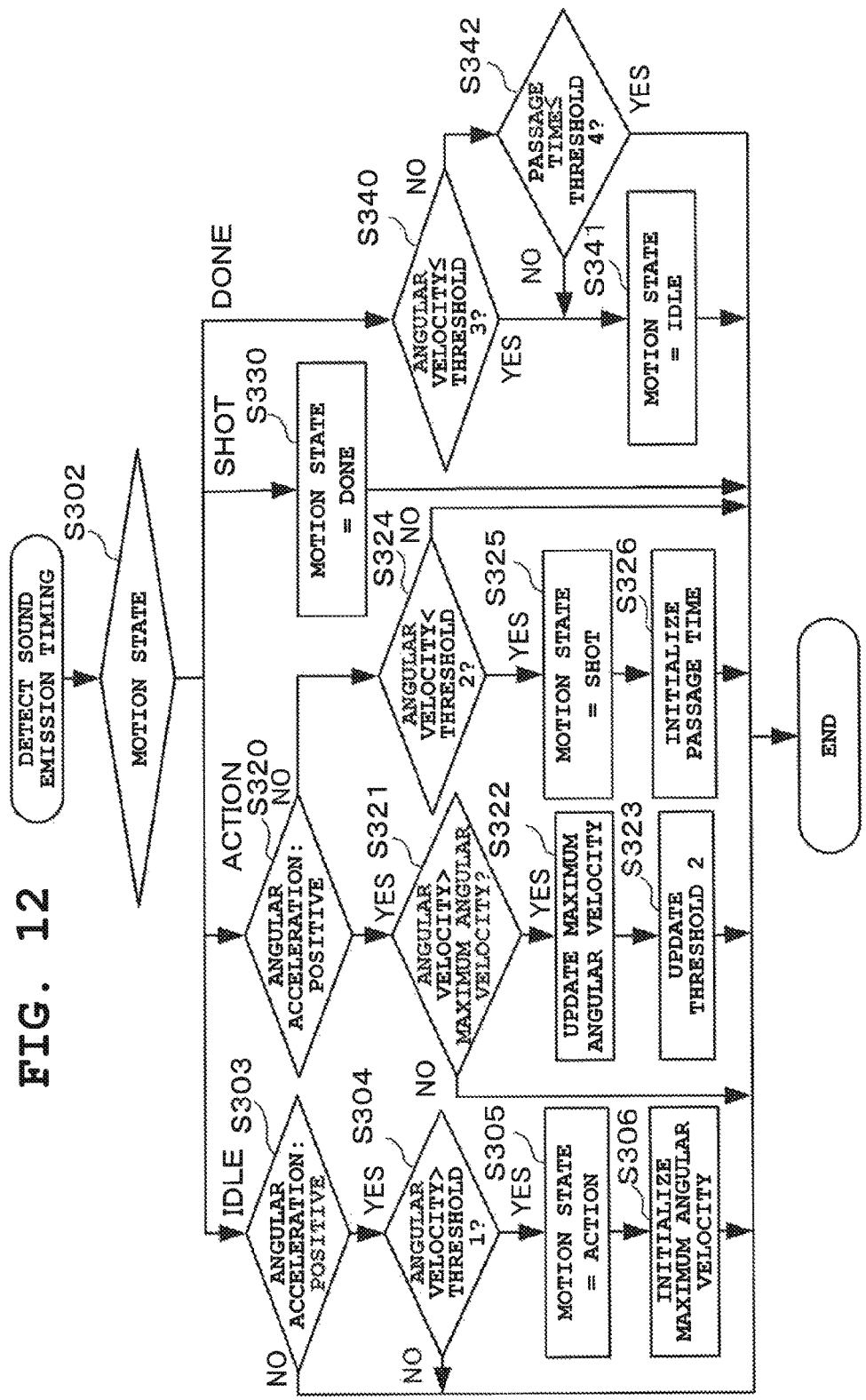

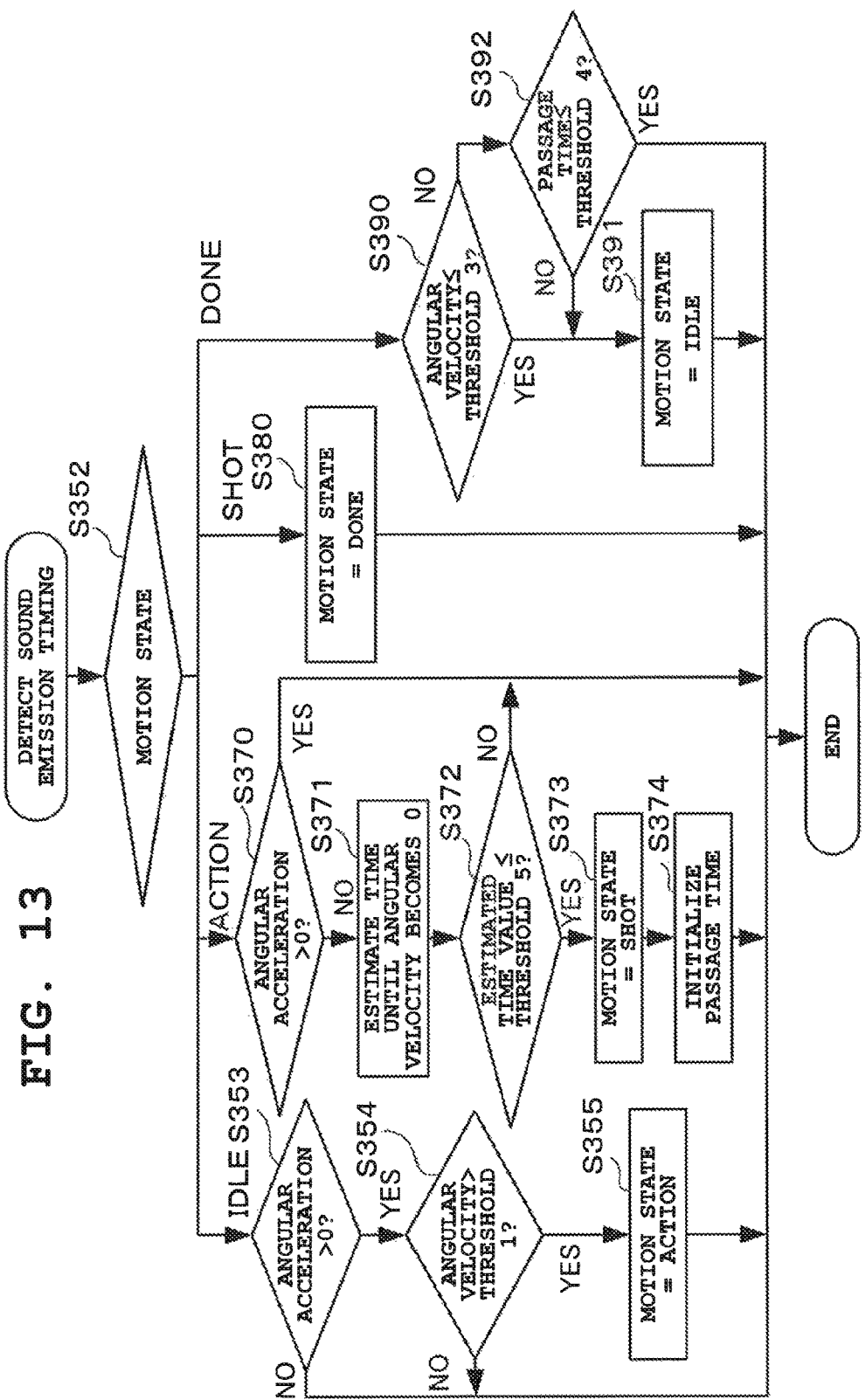

ANGULAR VELOCITY VALUE

ANGULAR ACCELERATION VALUE

ACCELERATION IN ROTATING DIRECTION

MOTION STATE TRANSITIONS

ORIENTATION DETECTION DEVICE, ORIENTATION DETECTION METHOD AND PROGRAM STORAGE MEDIUM

CROSS-REFERENCE TO RELATED APPLICATION

This application is based upon and claims the benefit of priority from the prior Japanese Patent Application No. 2012-084369, filed Apr. 2, 2012, the entire contents of which is incorporated herein by reference.

BACKGROUND OF THE INVENTION

1. Field of the Invention

The present invention relates to an orientation detection device, an orientation detection method and a program storage medium.

2. Description of the Related Art

Conventionally, a musical performance device has been proposed which detects the playing motion of an instrument player and emits a sound corresponding to the playing motion. For example, a musical performance device is known which emits a percussion sound with a structure only including a drumstick-shaped member. In this musical performance device, a sensor is provided to its drumstick-shaped member. When the instrument player holds and swings the member by hand, the sensor detects the playing motion, and a percussion sound is emitted.

With this virtual musical performance device, a musical sound of a musical instrument can be emitted without requiring a real musical instrument, and therefore the instrument player can enjoy playing without restrictions on a playing place or a playing space.

As a virtual musical performance device as described above, for example, Japanese Patent Application Laid-Open (Kokai) Publication No. 2007-256736 discloses a musical performance device which is structured such that an acceleration sensor is provided to a drumstick-shaped member, and emits a musical sound after an output (an acceleration value) obtained from the acceleration sensor by shaking the member reaches a predetermined threshold.

Meanwhile, in the virtual musical performance device, a different musical sound is often provided for each different playing motion of an instrument player. Also in the configuration of the musical performance device disclosed in Japanese Patent Application Laid-Open (Kokai) Publication No. 2007-256736, a geomagnetic sensor is used to determine the orientation of the drumstick-shaped member and a musical sound of a different timbre can be emitted according to the orientation. In this case, however, since a sound source can be placed only in a horizontal direction, the maximum number of sound sources is three or four, and sound sources more than this cannot be placed. Moreover, since the geomagnetic sensor is vulnerable to disturbances and unstable, if the geomagnetic sensor is moved at high speed as the drumstick, accuracy of azimuth estimation is degraded.

SUMMARY OF THE INVENTION

The present invention has been conceived in light of the above-described problems. An object of the present invention is to provide an orientation detection device which corrects a gravity direction when a drumstick-shaped member is moved at high speed, and thereby improves accuracy in estimating the orientation of a drumstick-shaped member.

In accordance with one aspect of the present invention, there is provided an orientation detection device comprising: a holding member which is operated by a user; a magnetic sensor which detects magnetism occurring in each direction of three axes of the holding member which are orthogonal to each other; a storage control section which stores in memory the magnetism by geomagnetism detected by the magnetic sensor in an initial stationary state of the holding member and an orientation parameter in the initial stationary state; an obtainment section which obtains the magnetism detected by the magnetic sensor at every predetermined timing; an accumulation section which accumulates output values of each axis component of the magnetic sensor obtained at every predetermined timing by the obtainment section; and a correction section which corrects the orientation parameter so that the output value of each axis component of the magnetic sensor accumulated by the accumulation section conforms to initial magnetism stored in the memory.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 12 is a flowchart of sound emission timing detection processing in a first example;

FIG. 13 is a flowchart of sound emission timing detection processing in a second example;

DETAILED DESCRIPTION OF THE PREFERRED EMBODIMENTS

Hereafter, embodiments of the present invention are described using the drawings.

An embodiment of the present invention is described below with reference to the attached drawings.

Figure 1:
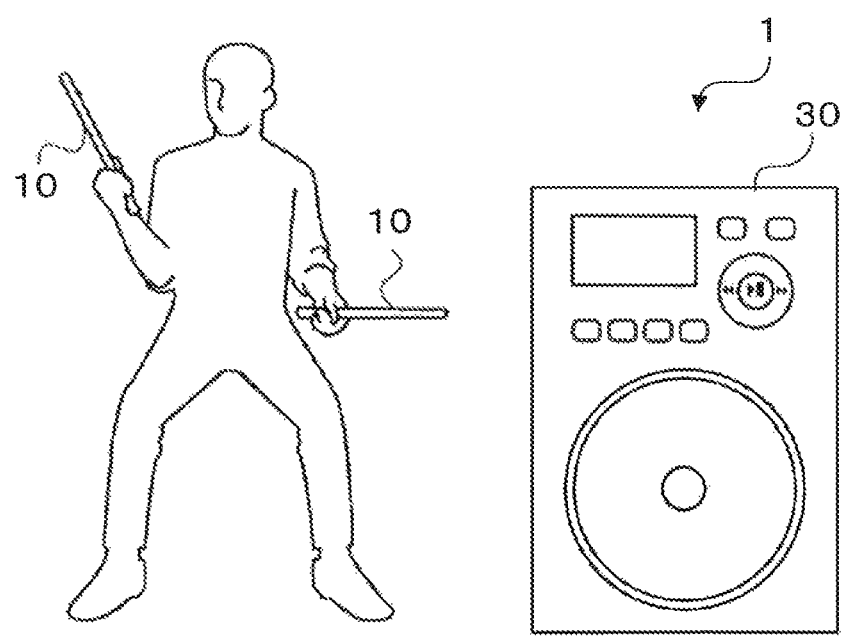
FIG. 1 is a diagram outlining an embodiment of a musical performance device of the present invention.

FIG. 1 is a diagram outlining a musical performance device 1 of an embodiment of the present invention. As depicted in FIG. 1, the musical performance device 1 of the present invention includes a drumstick section 10 and a sound emitting section 30.

The drumstick section 10 is a drumstick-shaped member extending in a longitudinal direction. An instrument player performs a playing motion by holding one end (a bottom side) of the drumstick section 10 and performing upswing and downswing motions centering on his or her wrist or the like. To detect this playing motion of the instrument player, an orientation, sensor 12 is provided at the other end (a tip side) of the drumstick section 10 (refer to FIG. 2).

The sound emitting section 30 emits a musical sound.

In the musical performance device 1, according to a playing motion using the drumstick section 10, that is, the downswing motion of the drumstick section 10, the sound emitting section 30 emits a predetermined musical sound. With this, music is played by the instrument player.

[Structure of Musical Performance Device 1]

Figure 2:
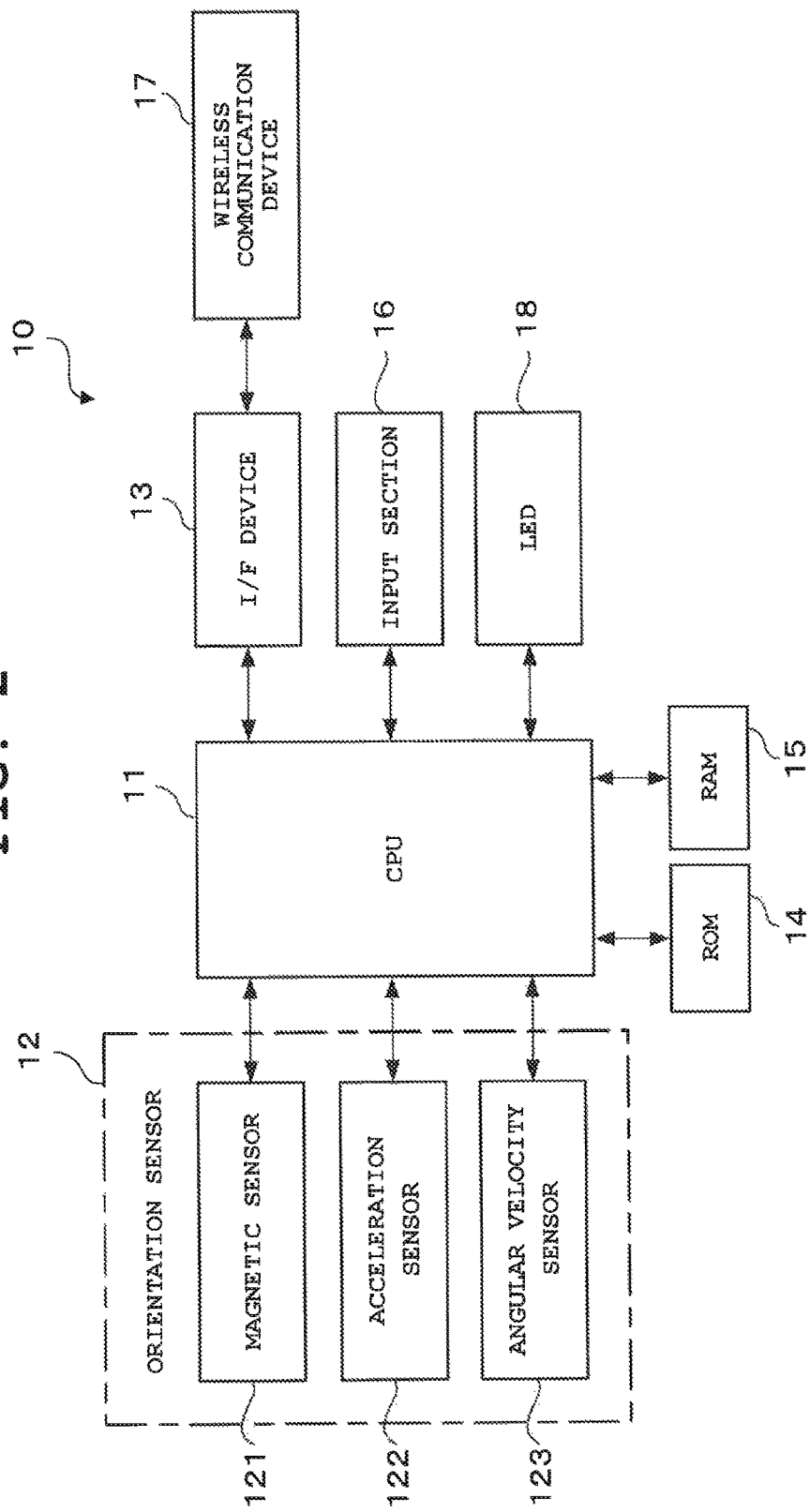
FIG. 2 is a block diagram showing the structure of a drumstick section of the musical performance device.
Figure 3:
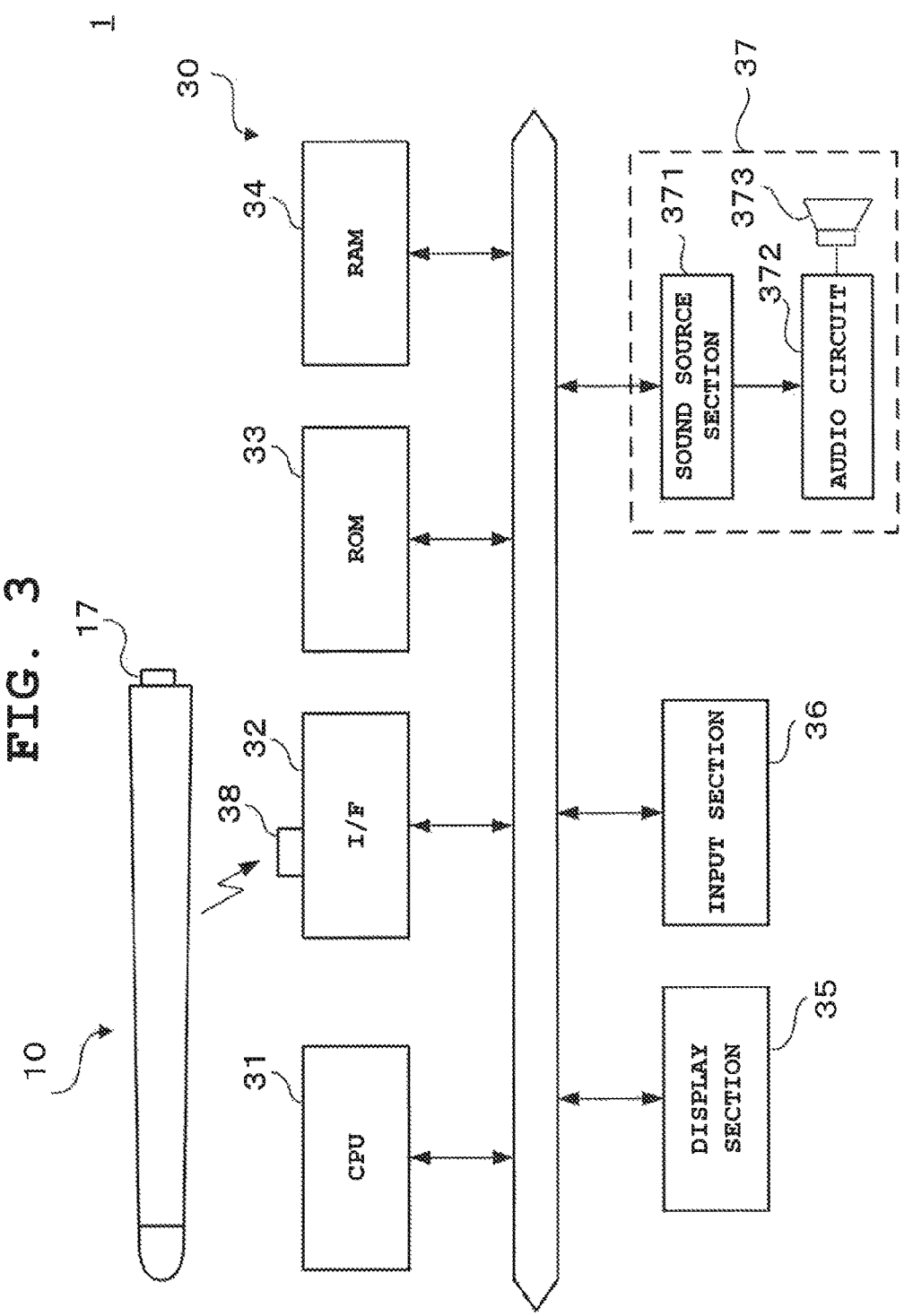
FIG. 3 is a block diagram showing the structure of a sound emitting section of the musical performance device.

First, with reference to FIG. 2 and FIG. 3, the structures of components of the musical performance device 1 of the present embodiment, specifically, the structures of the drumstick section 10 and the sound emitting section 30, are described.

[Structure of Drumstick Section 10]

FIG. 2 is a block diagram showing the structure of the drumstick section 10. As depicted in FIG. 2, the drumstick section 10 includes a CPU (Central Processing Unit) 11, the orientation sensor 12, an I/F (Interface) device 13, a ROM (Read Only Memory) 14, a RAM (Random Access Memory) 15, an input section 16, a wireless communication device 17, and an LED 18.

The orientation sensor 12 includes a triaxial magnetic sensor 121 which measures a geomagnetic direction, a triaxial acceleration sensor 122 for measuring acceleration added to the drumstick, and a triaxial angular velocity sensor 123 which measures a rotating motion of the drumstick. Each sensor can measure three axes x, y, and z each in an axial direction.

Figure 4:
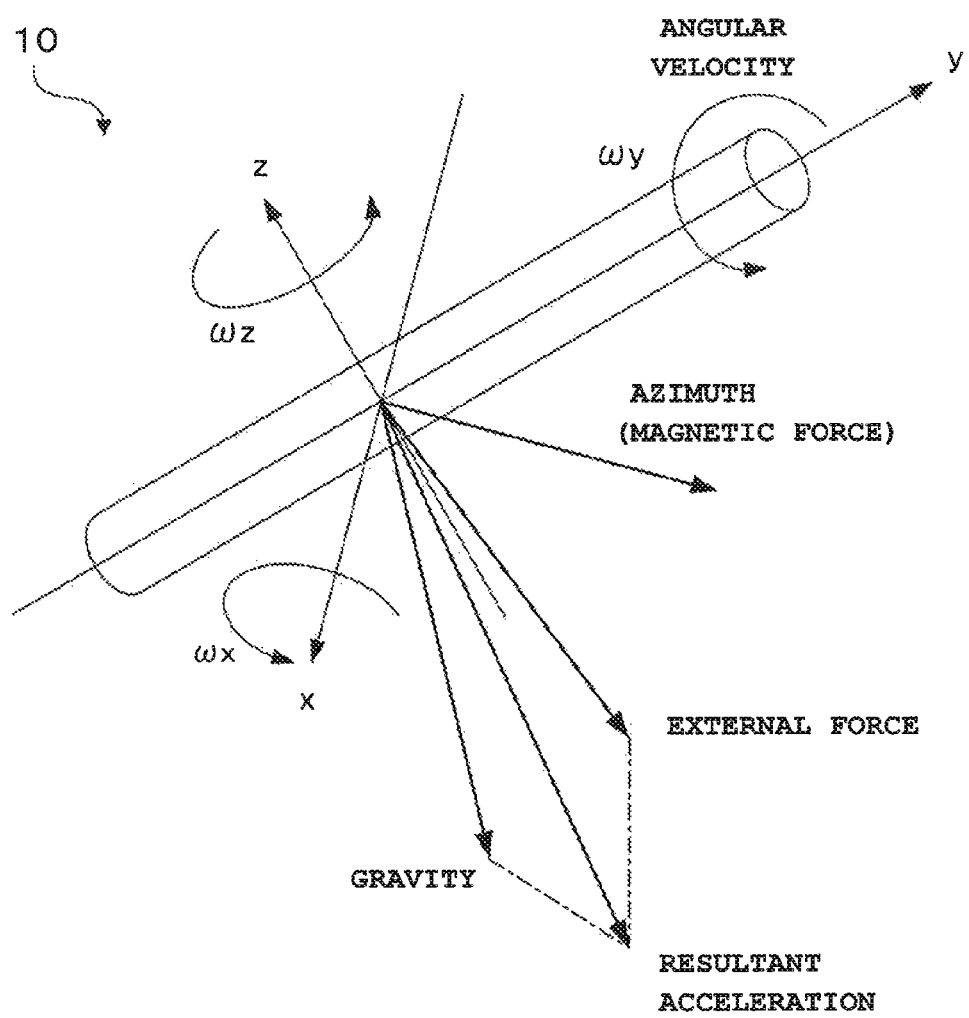
FIG. 4 is a diagram for describing the drumstick section of the musical performance device in detail.

With reference to FIG. 4, in the present embodiment, an axis conforming to an axis of the drumstick section 10 in a longitudinal direction is taken as y axis, an axis parallel with a substrate (not shown) where the orientation sensor 12 is placed and orthogonal to the y axis is taken as x axis, and an axis orthogonal to the x axis and the y axis is taken as z axis. The magnetic sensor 121 can obtain geomagnetic values of respective components of the x axis, the y axis, and the z axis of a geomagnetic vector. Also, the acceleration sensor 122 can obtain acceleration values of respective components of the x axis, the y axis, and the z axis. Furthermore, the angular velocity sensor 123 can obtain a value ($\omega x$, $\omega y$, $\omega z$) of respective components of angular velocities each centering on a relevant one of the axes.

Here, the instrument player holds the one end (on the bottom side) of the drumstick section 10, performs upswing and downswing motions centering on his or her wrist or the like, and thereby causes the drumstick section 10 to perform a rotating motion, a parallel motion, or the like. These motions are detected by the orientation sensor 12 and sent to the CPU 11.

Referring back to FIG. 2, the CPU 11 reads acceleration values, angular velocity values, geomagnetic directions and intensities detected by the orientation sensor 12 and, according to these values, detects the orientation of the drumstick and timing of sound emission. With this, the CPU 11 generates a note-on event corresponding to the sound emission, and transmits the note-on event to the sound emitting section 30 via the I/F device 13 and the wireless communication device 17. Here, the note-on event is command information for indicating to a sound source section 371 (refer to FIG. 3) the emission of a musical sound, and includes, in the present embodiment, information about timbre and pitch of a musical sound to be emitted and a sound volume of the musical sound.

As such, the CPU 11 transmits a note-on event to the sound emitting section 30 based on each sensor value of the orientation sensor 12 included in the drumstick section 10, and thereby allows the sound emitting section 30 to emit a predetermined musical sound based on the playing motion using the drumstick section 10.

The ROM 14 has stored therein processing programs for a variety of processing to be performed by the CPU 11, that is, as described above, data obtainment by the orientation sensor 12, note-on event generation processing, note-on event transmission processing and the like. The RAM 15 has stored therein each sensor value of the orientation sensor 12 and values obtained or generated in processing. The I/F device 13 outputs data to the wireless communication device 17 according to an instruction from the CPU 11.

The input section 16 has various switches (not shown), accepting various instruction inputs from the instrument player.

The wireless communication device 17 performs a predetermined wireless communication with the sound emitting section 30. The predetermined wireless communication may be performed with any method. In the present embodiment, the wireless communication device 17 performs a wireless communication with the sound emitting section 30 via an infrared communication. The LED 18 lights up and out according to the control from the CPU 11. The LED 18 is used to indicate a processing state of the drumstick, such as initialization of the drumstick orientation.

[Structure of Sound Emitting Section 30]

Next, the structure of the sound emitting section 30 is described with reference to FIG. 3. FIG. 3 is a block diagram of the structure of the sound emitting section 30. As depicted in FIG. 3, the sound emitting section 30 includes a CPU 31, an I/F (Interface) 32, a ROM 33, a RAM 34, a display section 35, an input section 36, and a sound system 37. The I/F 32 of the sound emitting section 30 accepts data (for example, a note-on event, which is control data for emitting a musical sound), stores the data in the RAM 34, and notifies the CPU 31 of data acceptance. In the present embodiment, the wireless communication device 17 is provided to the drumstick section 10, and an infrared communication device 38 is provided to the sound emitting section 30. By a wireless signal issued from the wireless communication device 17 of the drumstick section 10 being received by the infrared communication device 38, the I/F 32 receives data from the drumstick section 10.

The CPU 31 performs a variety of processing, such as control over the entire musical performance device 1, in particular, control over the sound emitting section 30, detection of operation of a key switch (not shown) constituting the input section 36, and musical sound emission based on a note-on event from the drumstick section 10 received via the I/F 32.

The ROM 33 has stored therein various programs for processing, such as control over the entire musical performance device 1, in particular, control over the sound emitting section 30, detection of operation of the key switch (not shown) configuring the input section 36, and musical sound emission based on a note-on event received via the I/F 32. The ROM 33 includes a waveform data area for storing waveform data of various timbres, for example, those of wind instruments such as flutes, saxophones, and trumpets; keyboard instruments such as pianos; stringed instruments such as guitars; and percussion instruments such as bass drums, high-hats, snare drums, cymbals, and tamtams.

The RAM 34 stores a program read from the ROM 33 and data and parameters occurring in the course of processing. The data occurring in the course of processing includes those of an operation state of each switch of the input section 36, a note-on even received via the I/F 32, and the status of a body motion of the instrument player (such as an advance flag or a displacement amount).

The display section 35 is constituted by, for example, a liquid-crystal display device, and displays a selected timbre, a selected sound volume, the state of the body motion of the instrument player (a displacement amount from a reference position), and the like as images. The input section 36 has various switches (not shown), and accepts inputs of a variety of information from the instrument player.

The sound system 37 includes the sound source section 371, an audio circuit 372, and a loudspeaker 373. The sound source section 371 reads waveform data from the waveform data area of the ROM 33 by following an instruction from the CPU 31 to generate musical sound data for output. The audio circuit 372 converts musical sound data outputted from the sound source section 371 to an analog signal, and amplifies and outputs the analog signal obtained by conversion to the loudspeaker 373. With this, a musical sound is outputted from the loudspeaker 373.

[Description of Coordinate System]

Figure 5:
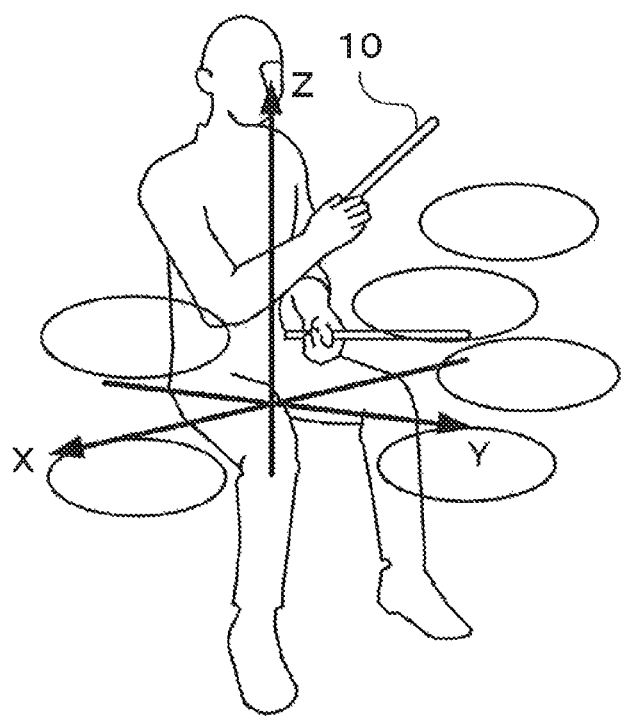
FIG. 5 is a diagram for describing a world coordinate system according to an embodiment of the musical performance device of the present invention.

Next, the orientation of the drumstick and a world coordinate system in the present embodiment are described with reference to FIG. 5. Here, the world coordinates refer to a coordinate system centering on an instrument player. As in FIG. 5, when viewed from the instrument player, a right horizontal direction is defined as X axis, a forward horizontal direction is defined as Y axis, and a zenithal direction is defined as Z axis. These axes are different from the x axis, the y axis, and the z axis depicted in FIG. 4, which are three axes of the drumstick section 10. In the present embodiment, while the three axes of the drumstick section 10 are called a local coordinate system and represented by lower-case letters, the three axes in the world coordinate system are represented by upper-case letters. As the instrument player swings the drumstick section 10, a relation between the local coordinates and the world coordinates is changed with time. The orientation of the drumstick refers to how the local coordinate system of the drumstick section 10 is oriented when viewed from the world coordinate system.

When the drumstick section 10 moves, the origin of the local coordinate system when viewed from the origin of the world coordinate system also moves. The origin of the local coordinate system when viewed from the world coordinate system is referred to as a position of the drumstick section 10.

[Processing of Musical Performance Device 1]

Next, processing of the musical performance device 1 of the present embodiment is described. First, the processing to be performed in the drumstick section 10 is briefly described with reference to FIG. 6.

Figure 6:
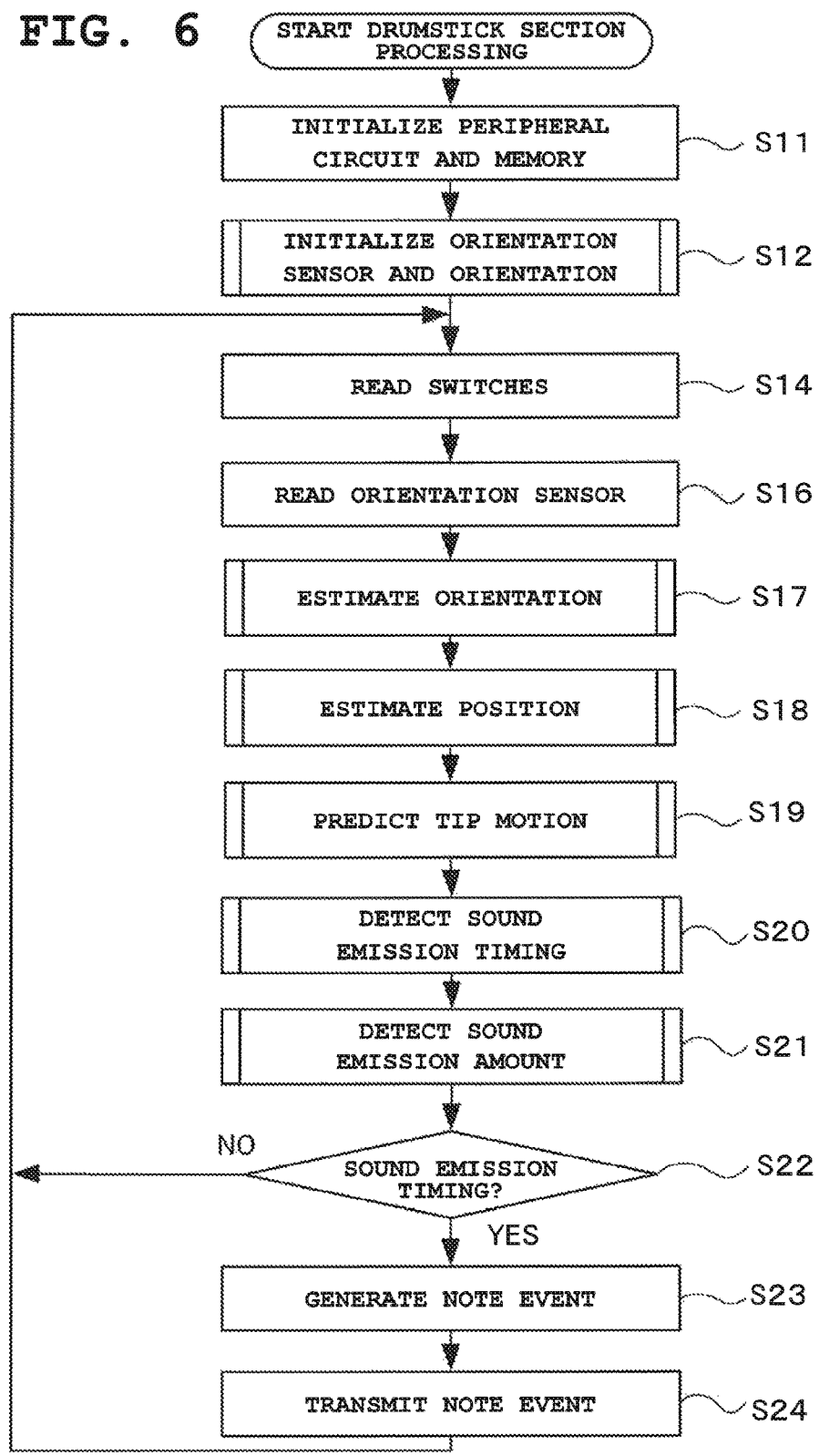
FIG. 6 is a flowchart of processing to be performed by a CPU of the drumstick section.

FIG. 6 is a flowchart of the processing to be performed by the CPU 11 of the drumstick section 10. The CPU 11 reads program code from the ROM 14 for execution.

First, the CPU 11 performs initialization processing including initialization of various sensors included in the orientation sensor 12 and clearing of data in the RAM 15 (Step S11). When the initialization processing ends, the CPU 11 adjusts offset, gain, and the like which change due to device variations and temperature of various sensors included in the orientation sensor 12 (Step S12). Next, the CPU 11 reads the status of the switches of the input section 36 and stores the status in the RAM 15 (Step S14). The status of the switches stored in the RAM 15 is used, for example, for assisting position detection, which will be described further below.

Next, when the user swings the drumstick section 10, the CPU 11 performs processing for emitting a sound according to the swing (Steps S16 to S24). First, the CPU 11 stores an acceleration value and an angular velocity value of the orientation sensor 12 and direction and intensity of geomagnetism in the RAM 15 (Step S16).

According to the read values, the CPU 11 estimates the orientation of the drumstick section 10 (Step S17), and then estimates the position in translation of the drumstick section 10 (Step S18). Furthermore, the CPU 11 predicts the motion of the tip of the drumstick section 10 (Step S19), and detects sound emission timing by using the predicted motion (Step S20). Still further, the CPU 11 detects a sound emission amount (Step S21). When sound emission timing is detected (when the motion state is "SHOT", which will be described further below) at Step S20 (when a judgment result at Step S22 is YES), the CPU 11 determines a timbre and pitch of a musical sound according to the orientation and position of the drumstick section 10 and generates a note-on event (Step S23), and transmits the generated note-on event to the sound emitting section 30 (Step S24).

[Initialization of Orientation Sensor and Orientation]

Figure 7:
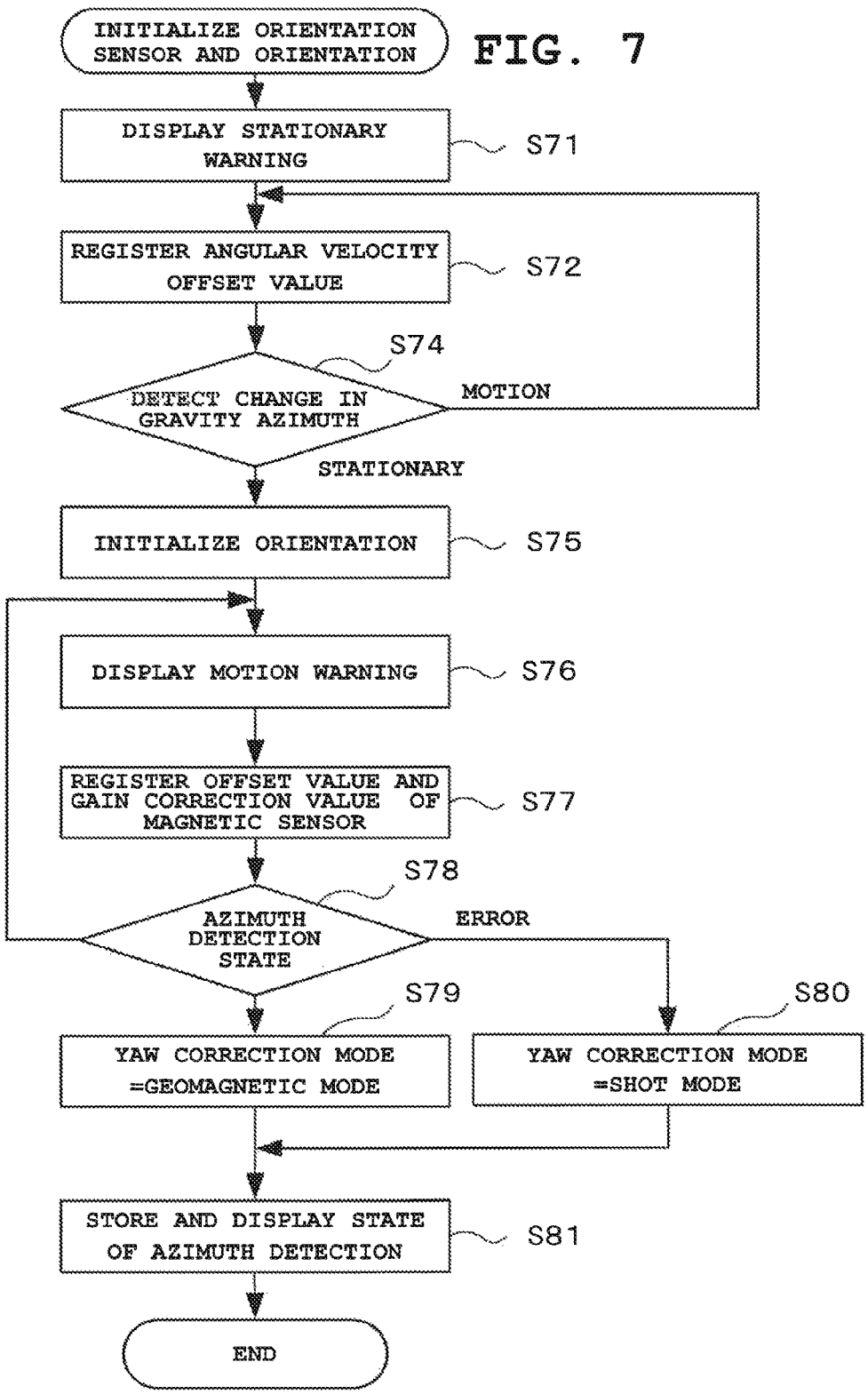
FIG. 7 is a flowchart of processing for initializing an orientation sensor and an orientation.
Figure 16:
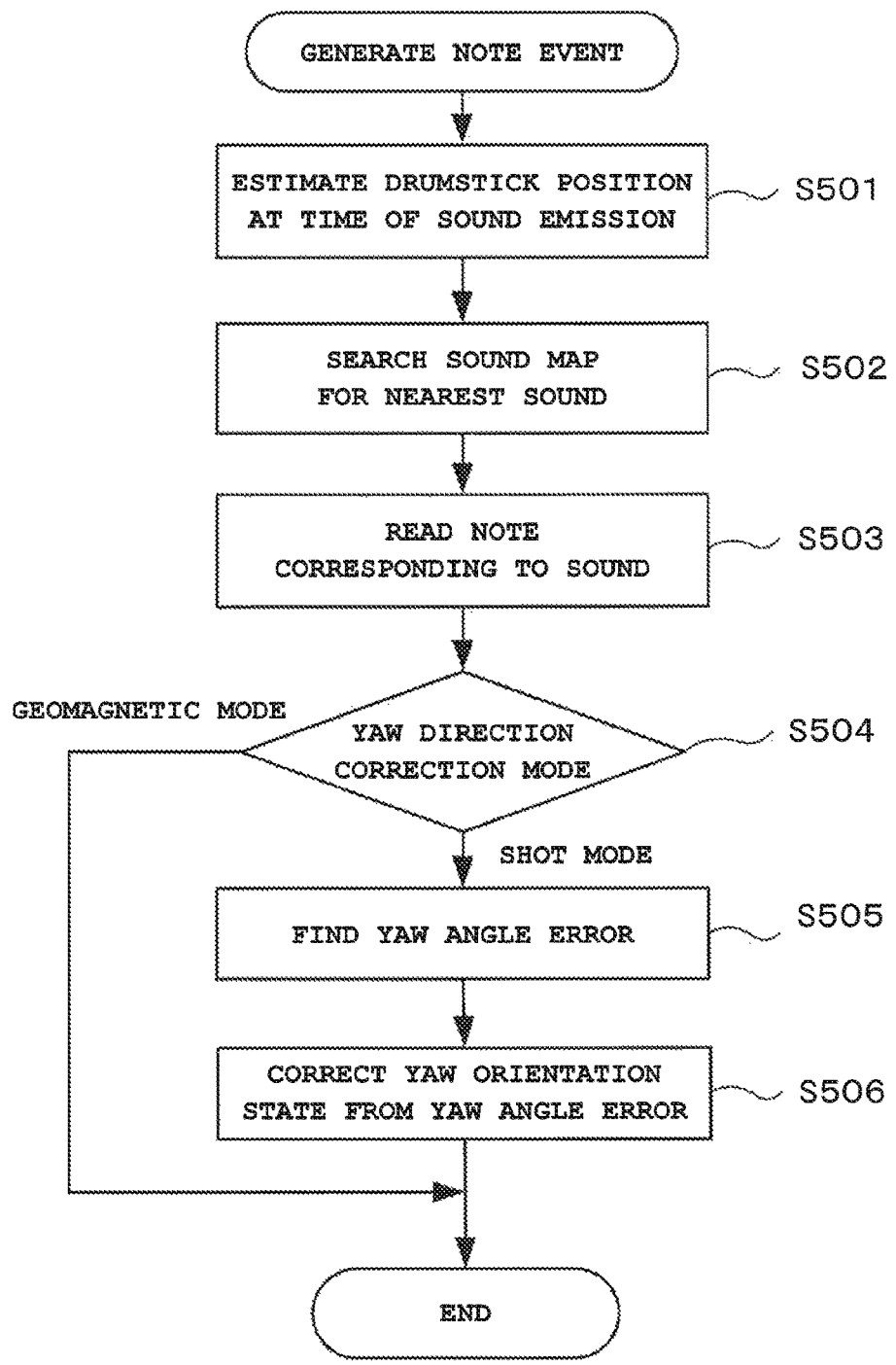
FIG. 16 is a flowchart of note event generation processing.

With reference to FIG. 7, processing for initializing the orientation sensor and the orientation at Step S12 of FIG. 16 is described in detail.

FIG. 7 is a flowchart of the processing for initializing the orientation sensor and the orientation.

First, the CPU 11 performs display so as to ask the user to stay stationary with the tip of the drumstick section 10 oriented in a forward direction (Step S71). In a display example, the CPU 11 causes the LED 18 to light up in green.

Next, the CPU 11 reads data of each axis of the angular velocity sensor 123. In the angular velocity sensor 123, due to device variations and temperature fluctuations, an offset value normally fluctuates when the angular velocity is 0. The CPU 11 stores the value of the angular velocity sensor 123 in the RAM 15 as an offset value (Step S72). In the following steps, when reading the value of the angular velocity sensor 123, the CPU 11 subtracts the offset value from the read value, and thereby adjusts the angular velocity to 0 when the drumstick section 10 stays stationary.

Next, the CPU 11 reads data of each axis of the acceleration sensor 122 to compare the read data with the previous acceleration, and thereby judges whether a change in a gravity direction has been detected (Step S74). Specifically, when the drumstick section 10 is in a stationary state, the value of the acceleration sensor 122 only indicates each axis component in the gravity direction. Therefore, if the value of each axis component has not been changed, the CPU 11 can detect that the drumstick is in a stationary state. In the present embodiment, the CPU 11 detects that the drumstick is in a stationary state if there is no change for approximately one second. When the drumstick is detected to be in a stationary state, the CPU 11 completes registration of the offset value of the angular velocity, and proceeds to Step S75. On the other hand, when the drumstick is detected to have been moved, the CPU 11 proceeds to Step S72, and again registers the offset value.

Subsequently, the CPU 11 initializes the orientation (Step S75). Specifically, the CPU 11 initializes the relation between the world coordinate system and the local coordinate system such that, with the user orienting the tip of the drumstick section 10 in a forward direction, the direction in which the tip of the drumstick section 10 is oriented is the front direction of the world coordinate system (in Y axis direction). The CPU 11 also stores each axis component of angular velocity, acceleration, and geomagnetism at the time of initialization in the RAM 15.

Subsequently, the CPU 11 performs display for causing the user to orient the drumstick section 10 in various directions (Step S76). For example, the CPU 11 causes the LED 18 to light up in red.

Furthermore, the CPU 11 finds an offset and gain correction data of the magnetic sensor 121 (Step S77). Specifically, in response to the processing at Step S76, the CPU 11 causes the magnetic sensor 121 to measure geomagnetic values when the user orients the drumstick section 10 in various directions, and thereby finds correction data by using the geomagnetic values obtained by measurement. As an example of how to find offset and gain values, the CPU 11 calculates a median value from a maximum value and a minimum value of each axis of the magnetic sensor 121, and sets the calculated median value as an offset value of each axis.

Also, the CPU 11 calculates a gain correction value so that values from the center to the maximum value in the respective axes are equal, and stores the calculated offset value and the gain correction value in the RAM 15. At the following steps, when a value of the magnetic sensor 121 is read out, the CPU 11 subtracts the offset value from the read value and multiplies the resultant value by the correction gain to correct the geomagnetic value and sets the corrected value as a detection value.

Subsequently, the CPU 11 judges whether the detected geomagnetic value is a value to be detected on the ground in general (Step S78). When the detected geomagnetic value is not a value to be detected on the ground in general, the CPU 11 returns to Step S76, and again finds an offset value and a gain correction data of the magnetic sensor 121. When the detected geomagnetic value is a value to be detected on the ground in general, the CPU 11 proceeds to Step S79, and sets a yaw correction mode to a geomagnetic mode.

Also, when the detected geomagnetic value is not a value to be detected on the ground in general even if the processing at Step S78 is repeated at a predetermined number of times (for example, five times), the CPU 11 proceeds to Step S80, and sets a yaw correction mode to a shot mode. When the processing at Step S79 or Step S80 ends, the CPU 11 proceeds to Step S81, and performs display indicating whether the yaw correction mode is a geomagnetic mode or a shot mode. For example, the CPU 11 causes the LED 18 to light up in red in the case of the shot mode, and causes the LED 18 to light up in green in the case of the geomagnetic mode. The sensor value correction processing of the angular velocity sensor 123 and that of the magnetic sensor 121 may change places in an order.

[Orientation Estimation]

Figure 8:
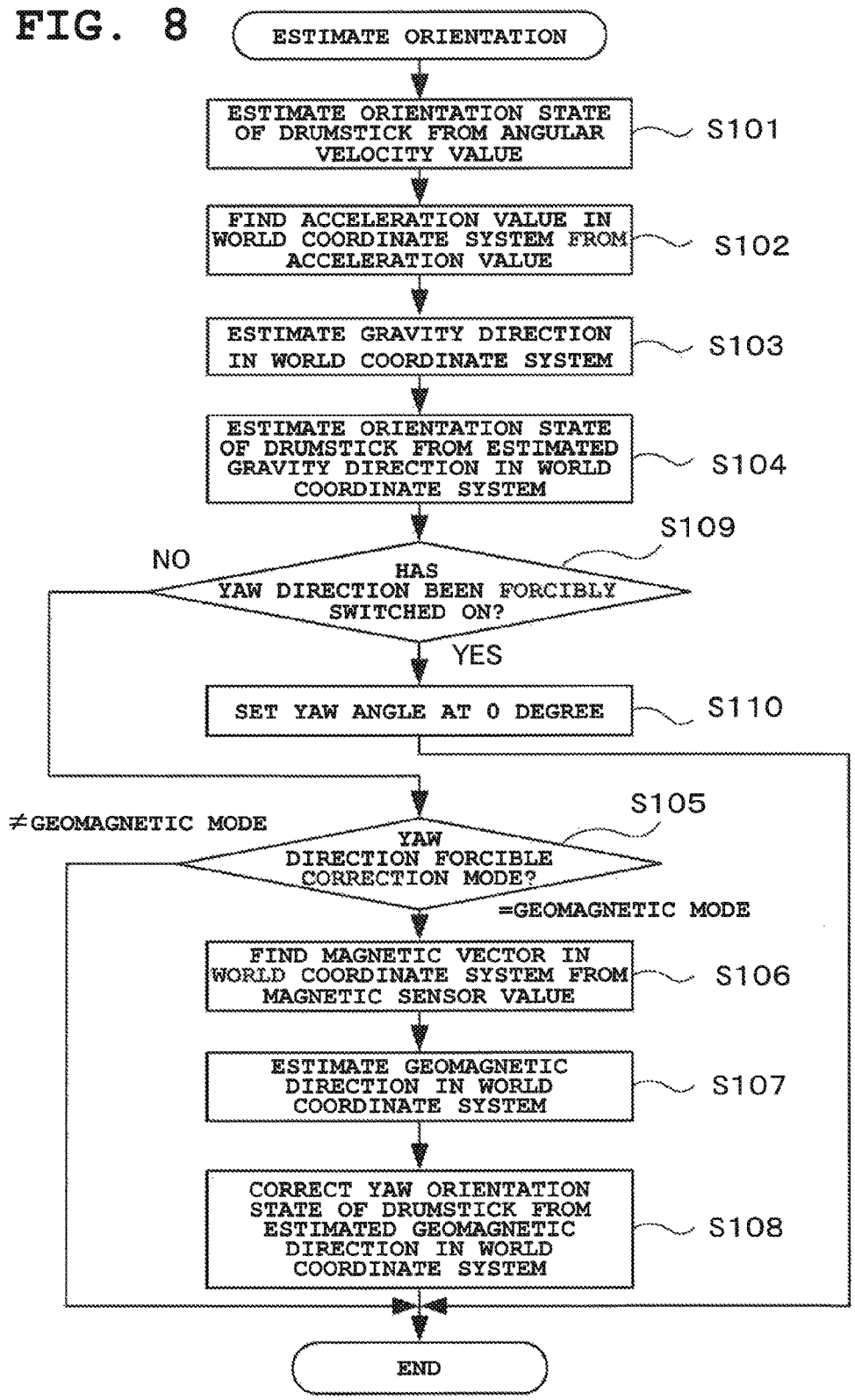
FIG. 8 is a flowchart of orientation estimation processing.

With reference to FIG. 8, the orientation estimation processing at Step S17 of FIG. 6 is described in detail.

FIG. 8 is a flowchart of the orientation estimation processing.

With base vectors of the x axis, the y axis, and the z axis of the local coordinate system when viewed from the world coordinate system as $e_x$, $e_y$, and $e_z$ to define a matrix $T_{L \to W}$ ($e_x e_y e_z$) having the respective base vectors arranged in columns the following relational expressions 1 and 2 holds between a point $p=(xyz)^T$ in the local coordinate system, and a point $P=(XYZ)^T$ in the world coordinate system corresponding to the point p (operator T refers to a transposed matrix):

$$P = T_{L \to W} p \quad \text{Equation 1 and}$$

$$p = T_{L \to W}^T P \quad \text{Equation 2.}$$

As such, since $T_{L \to W}$ indicates the relation between the two coordinate systems, the current drumstick orientation state can be represented by using the relation between the two coordinate systems and the like. As an orientation representing method, an angle of pitch, yaw, roll, or the like may be used.

Meanwhile, from the value of the angular velocity sensor 123 read at a current time t, a ternary vector having the respective axis components in the local coordinate system can be obtained. By multiplying the value of each axis component of the ternary vector by δT, which is a sampling time of the angular velocity sensor 123, a rotation angle vector $\theta t = (\theta_{xt} \theta_{yt} \theta_{zt})^T$ can be found.

With this rotation angle vector, the orientation of the drumstick can be found. Specifically, by using a resultant matrix $R_{all}(\theta_t)$ of rotation of $\theta_{xt}$ about the x axis, rotation of $\theta_{yt}$ about the y axis, and rotation of $\theta_{zt}$ about the z axis and a previous orientation $T_{L \to Wt-1}$, an orientation $T_{L \to Wt}$ can be estimated as $T_{L \to Wt} = R_{all}(\theta_t) T_{L \to Wt-1}$. As such, the CPU 11 updates the previous orientation to estimate the current orientation based on the current values of the angular velocity sensor 123 (Step S101).

However, in the orientation found as described above, errors accumulate. Also, once the orientation has an error, accuracy of orientation estimation thereafter is significantly degraded. For example, consider that the drumstick section 10 is rotated from a forward horizon straight toward a right horizon. First, if an error occurs in the rotation not in a horizontal direction but in a vertical direction, the drumstick rotates with the trajectory of the tip of the drumstick diagonally rising upward. Then, a new rotation is added again to the orientation, and therefore the orientation becomes shifted at an accelerated rate from a proper orientation. Therefore, orientation estimation is corrected by performing gravity estimation, and thereby increases orientation accuracy.

An acceleration vector detected by the acceleration sensor 122 includes components of the respective axes in the local coordinate system. This acceleration vector is represented by a world coordinate system vector by using orientation information found at Step S101.

If no external force is added, the acceleration sensor 122 only detects gravity. Therefore, when the acceleration vector in the local coordinate system detected by the acceleration sensor 122 is converted to a vector in the world coordinate system, the vector always indicates the same direction. However, since an external force such as a centrifugal force is added during the motion of the drumstick section 10, the vector is not necessarily always oriented to the same direction. However, since the user swings the drumstick section 10 as being in a stationary state, the position of the drumstick section 10 does not move. Moreover, the velocity becomes 0 in many cases such as the drumstick section 10 is swung upward or downward. That is, an integral of the external force obtained by excluding a gravity component from the acceleration vector becomes 0 in many cases. Thus, the vector obtained by integrating the acceleration vector in the world coordinate system approximately indicates a gravity direction. By using this property, the gravity direction of the world coordinate system is estimated.

Specifically, the acceleration value of each axis component obtained by the acceleration sensor 122 read at the current time t is taken as $_L A_T = (A_{xt}, A_{yt}, A_{zt})^T$, and since this acceleration value is in the local coordinate system, the CPU 11 carries out a calculation by conversion to the world coordinate system based on Equation 3 (Step S102):

$$_W A_T = T_{L \to Wt} \cdot _L A_T \qquad \text{Equation 3.}$$

Next, for each component regarding the acceleration vector obtained by conversion to the world coordinate system, the CPU 11 calculates an average value from the current time to a predetermined time to find an average acceleration vector. The predetermined time is experimentally determined based on the swing state or the like. The CPU 11 estimates this average acceleration vector as a gravity direction vector $_W e_{gt}$ (Step S103).

Specifically, the following Equation 4 is defined, and accumulation is performed by recursive addition. $K_g$ is a damping coefficient, and is experimentally determined based on the swing state or the like:

$$Gw_t = k_g \cdot Gw_{t-1} + _W A_t \qquad \text{Equation 4.}$$

From $Gw_t$, the gravity direction vector $_W e_{gt}$ in the world coordinate system is estimated by $_W e_{gt} = GW_t / |Gw_t|$.

Next, the CPU 11 corrects the orientation parameter $T_{L \to Wt}$ so that the gravity direction vector $_W e_{gt}$ becomes a negative direction vector $(0\ 0\ -1)^T$ on the z axis (Step S104). Specifically, the CPU 11 performs operation for rotation about an axis orthogonal to these two vectors, that is, the gravity direction vector $_W e_{gt}$ and the negative direction vector $(0\ 0\ -1)^T$ by an angle formed therebetween, and thereby corrects the orientation parameter $T_{L \to Wt}$. With this, a correction in the gravity direction is made, whereby accuracy of orientation estimation is improved.

Since the orientation is corrected as described above only in the gravity direction, error accumulations in a yaw angle centering on the Z axis are left. The present embodiment suggests two methods to correct the yaw angle, that is, a switch operation by the user and a correction by using geomagnetism.

First, a correction by a switch operation by the user is described. In this correction, a correction is made by the CPU 11 to the yaw angle by the user regularly pushing the input section 16 (for example, a switch) included in the drumstick section 10 at timing when the drumstick section 10 is oriented upward. The CPU 11 judges whether a yaw direction forcible switch has been turned ON (Step S109). In this processing, the CPU 11 judges whether a signal has been received that indicates that the yaw direction forcible switch has been turned ON.

If the judgment result at Step S109 is YES, the CPU 11 finds a rotation matrix that conforms a direction vector of the tip of the drumstick section 10 in the world coordinate system to a Y-axis direction vector in the world coordinate system and, by using this rotation matrix, corrects the orientation parameter (Step S110). With this, the yaw angle of the tip of the drumstick section 10 is set at 0 degree.

In this rotation matrix, consider a rotation angle vector having a length of an angle formed by two vectors and oriented to a vector direction orthogonal to these two vectors. For this rotation angle vector, a conversion can be made to find a resultant matrix by using the same method as that for finding a resultant rotation matrix for the orientation correction of the angular velocity sensor 123.

Next, correction using geomagnetism is described.

When the judgment result at Step S109 is NO, the CPU 11 judges whether the yaw direction correction mode is a correction mode in a geomagnetic mode (Step S105). If the mode is not a correction mode in a geomagnetic mode, the CPU 11 ends the orientation estimation processing.

If the mode is a correction mode in a geomagnetic mode, the CPU 11 takes the value of the geomagnetic vector found from the magnetic sensor 121 and read at the current time t as $_L M_T = (M_{xt}, M_{yt}, M_{zt})^T$. Since this value is in the local coordinate system, the CPU 11 makes a conversion to the world coordinate system based on Equation 5 (Step S106):

$$_W M_T = T_{L \to Wt} \cdot _L M_T \qquad \text{Equation 5.}$$

Next, for example, the CPU 11 performs smoothing by executing an IIR (Infinite Impulse Response) filter. A direction obtained by smoothing is estimated as a current geomagnetic direction $_W e_{mt}$ (Step S107).

Specifically, the following IIR filter operation (Equation 6) is performed for smoothing. $k_m$ is a filter coefficient experimentally determined based on a swing state or the like.

$$Mw_t = (1 - k_m) \cdot Mw_{t-1} + k_m \cdot _W A_t \qquad \text{Equation 6.}$$

From $Mw_t$, the geomagnetic direction vector $_W e_{mt}$ in a world coordinate system is estimated by $_W e_{mt} = Mw_t / |Mw_t|$.

Subsequently, the CPU 11 records a geomagnetic direction $_W e_{m0}$ in the world coordinate system at an initial state in the RAM 15, finds a rotation matrix so that the current geomagnetic direction $_W e_{mt}$ and the geomagnetic direction $_W e_{m0}$ in the world coordinate system at the initial state are oriented to the same direction on an XY plane in the world coordinate system, and makes a correction of the orientation parameter $T_{L \to Wt}$ by using the rotation matrix (Step S108). With this, a correction in the geomagnetic direction is performed, and therefore accuracy of orientation estimation is improved.

Specifically, consider vectors with a Z component of each vector being set at 0. Also, from these two vector directions, as with gravity correction, consider a vector oriented to a vector direction orthogonal to these two vectors and having a length at an angle formed by the two vectors. The rotation matrix described above can be represented with conversion to a resultant matrix of rotations of the values of the respective components of these vectors.

[Position Estimation]

Figure 9:
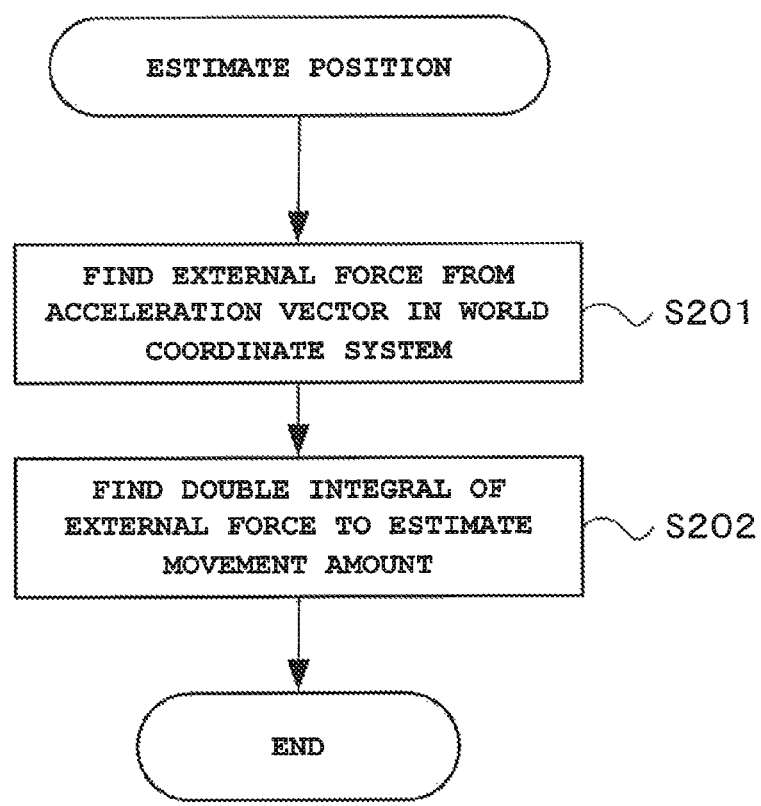
FIG. 9 is a flowchart of position estimation processing.

With reference to FIG. 9, the position estimation processing at Step S18 of FIG. 6 is described in detail.

FIG. 9 is a flowchart of the position estimation processing.

At orientation estimation, at Step S103 of FIG. 8, the gravity direction $_W e_{gt}$ in the world coordinates is estimated. The CPU 11 finds a vector by excluding a component in the gravity direction $_W e_{gt}$ from the acceleration vector in the world coordinate system, and defines the found vector as acceleration $_W F_T$ by an external force (Step S201). Furthermore, the CPU 11 integrates the acceleration $_W F_T$ by the external force to find a movement velocity $_W V_t$, and further integrates the movement velocity $_W V_t$ to find a movement amount $_W D_t$ on a horizontal plane (Step S202).

Since complete integral has an influence of error accumulation, incomplete integral is desirably used. A damping coefficient (a time constant) is adjusted by experiment. Thus found values are used in subsequent note event generation processing (refer to FIG. 16).

[Tip Motion Prediction]

Figure 10:
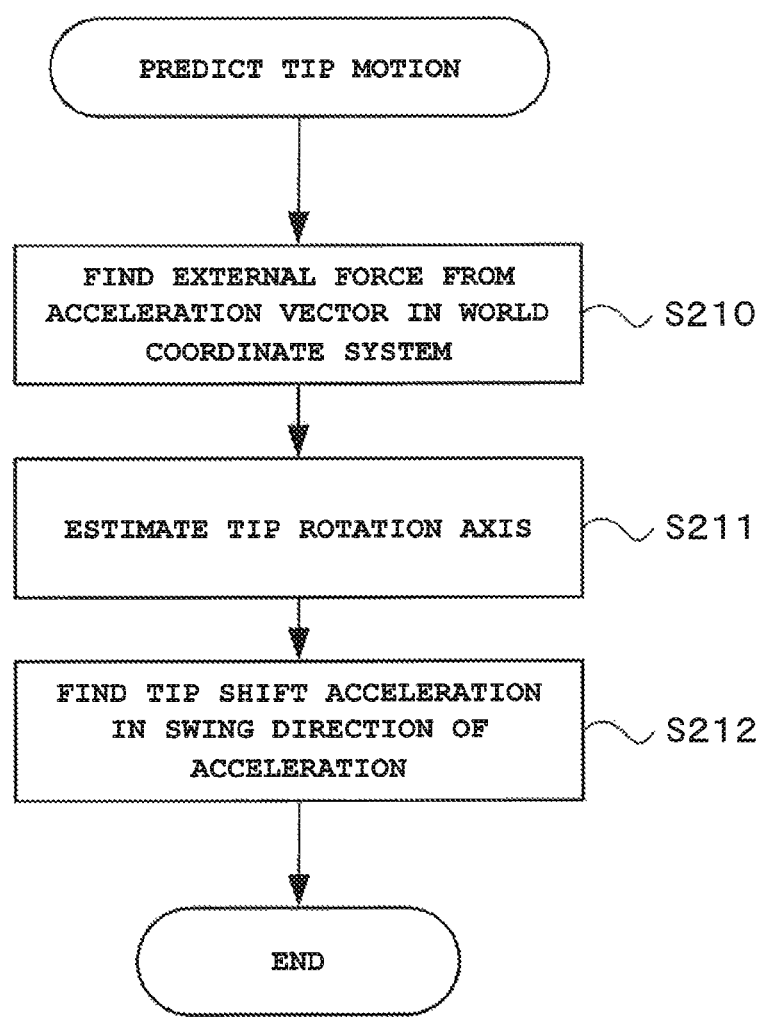
FIG. 10 is a flowchart of tip motion prediction processing.
Figure 11:
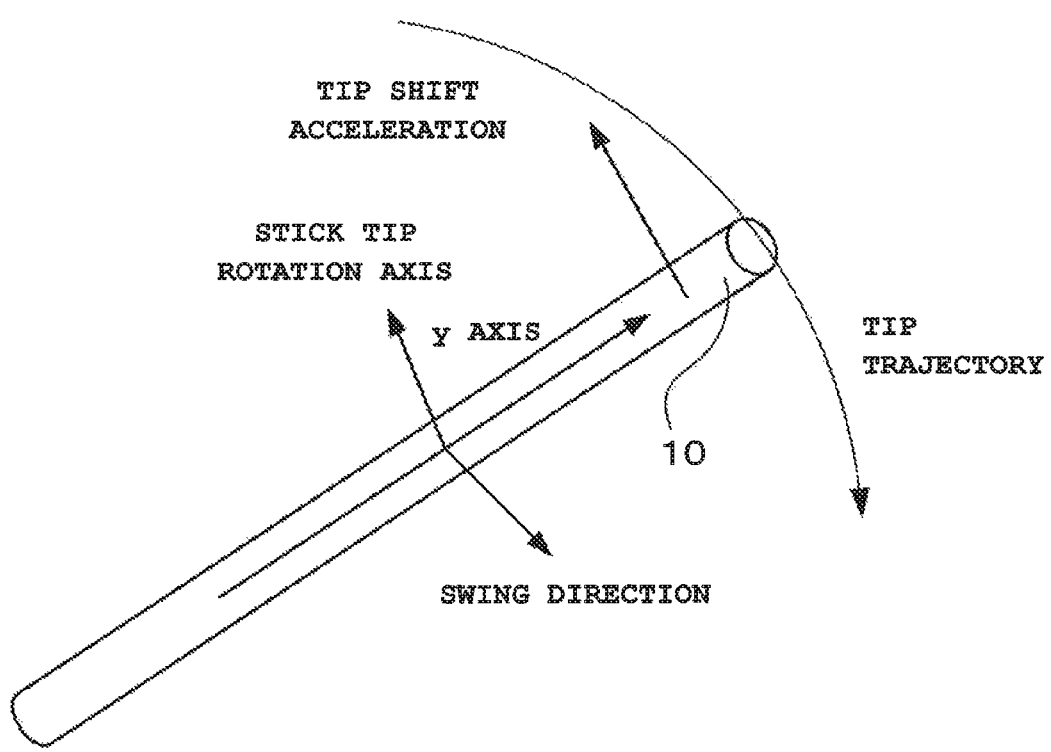
FIG. 11 is a diagram of a relation between a drumstick tip rotation axis and a swing direction of the drumstick section.

With reference to FIG. 10 and FIG. 11, the tip motion prediction processing at Step S19 of FIG. 6 is described in detail.

The magnitude of sound emission is desirably controlled with the velocity of the tip of the drumstick. In a velocity prediction method, the velocity is found from the acceleration sensor, but there is a problem in accuracy. Moreover, since the user swings the drumstick with a rotating motion centering on the elbow or shoulder or as extending the elbow, only the angular velocity is not enough, and the angular velocity and the velocity may not have a proportional relation. For this reason, in the present embodiment, the velocity is predicted by using the angular velocity and angular acceleration of the tip.

FIG. 10 is a flowchart of the tip motion prediction processing.

As an example of calculating the angular velocity and angular acceleration, the CPU 11 first takes angular velocity obtained by excluding components about the y axis from the angular velocity vector as an observation value $\omega V_t = (\omega_{xt} 0 \omega_{zt})^T$ of the angular velocity of the tip of the drumstick, and uses a Kalman filter or the like to estimate the value as angular velocity $\omega s$ and angular acceleration $\delta \omega s$ (Step S210).

For example, each angular velocity component can be calculated by adding an angular velocity component to the previous angular velocity component, and each angular acceleration component can be calculated by using a state model in which drive noise is added to the same angular acceleration component as the previous one. By using the angular velocity of the tip of the drumstick obtained as described above, the CPU 11 estimates the most recently averaged vector direction of the angular velocity as a drumstick tip velocity rotation axis $e_r$ (Step S211).

While estimation is achieved by using the Kalman filter in the present embodiment, an IIR filter may be used to smooth the values of the respective sensors and a difference therebetween to calculate angular velocity and angular acceleration.

A direction orthogonal to the drumstick tip rotation axis and the direction y axis of the drumstick (an outer product direction, refer to FIG. 11) is defined as a swing direction $e_s$. A tangent direction of a rotation motion of the tip is oriented to this swing direction. The CPU 11 finds a component $_L A s_t$ in the swing direction of an acceleration vector $_L A_t$ by calculating an inner product of $_L A_t$ and $e_s$.

[Sound Emission Timing Detection Processing]

With reference to FIG. 12 or FIG. 13, the sound emission timing detection processing at Step S20 of FIG. 6 is described in detail.

[Sound Emission Timing Detection Processing (First Example)]

FIG. 12 is a flowchart of sound emission timing detection processing in a first example.

First, the processing of the CPU 11 branches off according to the motion state (Step S302). There are four motion states: IDLE, ACTION, SHOT, and DONE. When the motion state is IDLE, the CPU 11 proceeds to Step S303. When the motion state is ACTION, the CPU 11 proceeds to Step S320. When the motion state is SHOT, the CPU 11 proceeds to Step S330. When the motion state is DONE, the CPU 11 proceeds to Step S340.

Figure 14A:
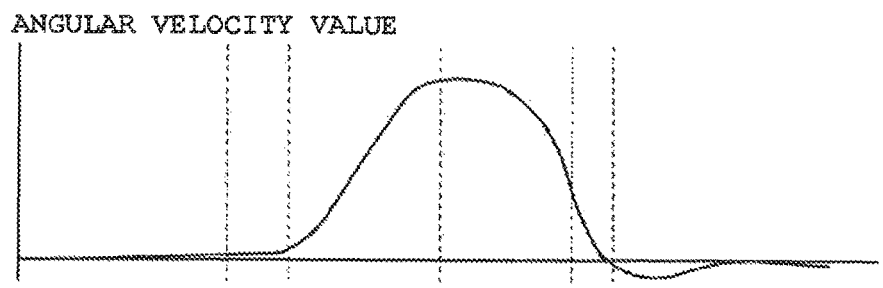
FIG. 14A to FIG. 14D are diagrams showing the transitions of a motion state of the drumstick section.
Figure 14B:
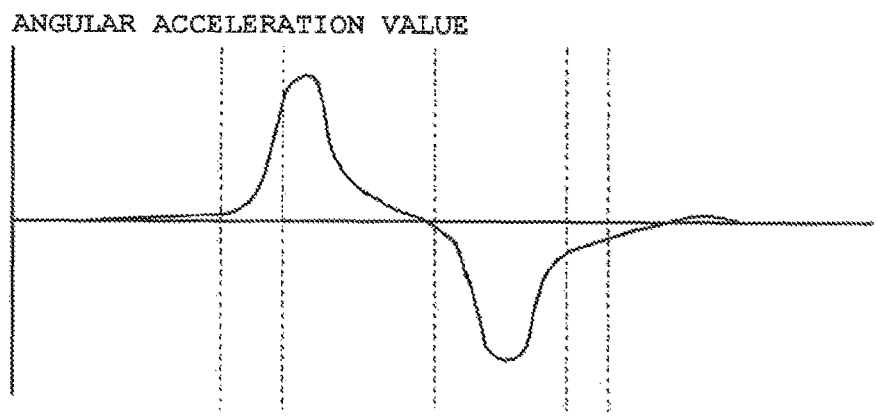
Figure 14C:
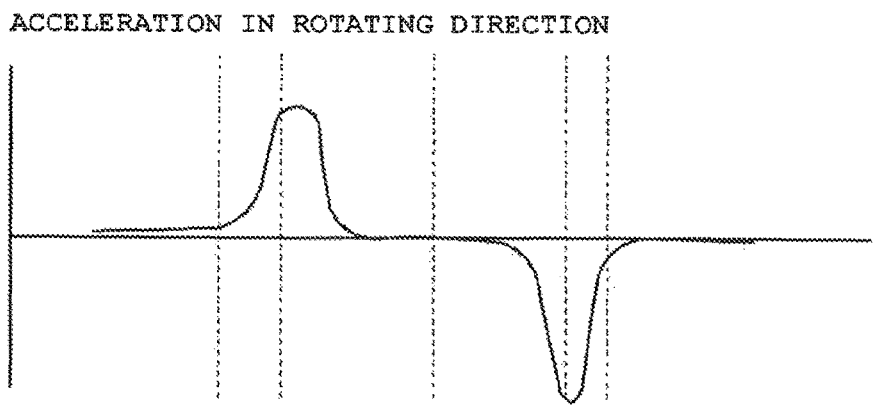
Figure 14D:
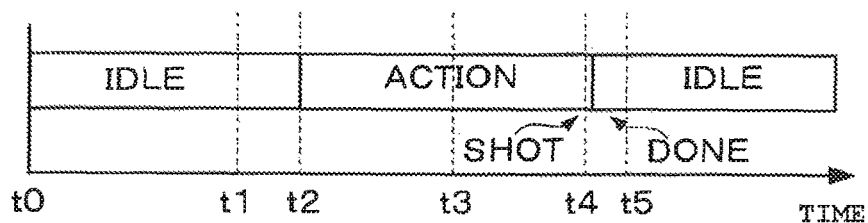

Here, standard transitions of the motion state are depicted in FIG. 14A to FIG. 14D. The horizontal axis represents a time axis in FIG. 14A to FIG. 14C, and the vertical axis represents the magnitude (the length of the vector) of the angular velocity in FIG. 14A. Although the sign are not much meaningful, for the purpose of convenience, a direction in which the drumstick section 10 is started to be swung is assumed to be positive. Also, in FIG. 14B, the vertical axis represents the magnitude (the length of the vector) of the angular acceleration. The sign oriented to the same direction as the positive direction of the angular velocity is assumed to be positive. FIG. 14C depicts acceleration in the rotating direction. FIG. 14D depicts transitions of the motion state.

IDLE represents a state in which the drumstick is stationary, and the motion state in an initial state has been initialized to IDLE. At a time t0 in the initial state, the motion state is IDLE. Here, the CPU 11 ends the sound emission timing detection processing when the angular acceleration of the drumstick section 10 is not positive (Step S303). Even if the angular acceleration of the drumstick section 10 is positive, when the angular velocity of the drumstick section 10 is equal to or smaller than "Threshold 1", the CPU 11 ends the sound emission timing detection processing (Step S304). When the angular velocity of the drumstick section 10 exceeds "Threshold 1", the CPU 11 proceeds to Step S305 (Step S304). FIG. 14A depicts that the angular velocity exceeds "Threshold 1" at a time t2. At Step S305, the CPU 11 changes the motion state to ACTION (Step S305), initializes a maximum angular velocity to 0 (Step S306), and ends the sound emission timing detection processing.

When the motion state becomes ACTION, the drumstick continues accelerating for the time being, during which the angular acceleration is positive. Therefore, the judgment result at Step S320 is YES, and the CPU 11 compares the current angular velocity with the retained maximum angular velocity (Step S321). When the angular velocity is larger than the maximum angular velocity, the CPU 11 updates the maximum angular velocity (Step S322) to update "Threshold 2" (Step S323). If the angular velocity is smaller than the maximum angular velocity, the CPU 11 ends the sound emission timing detection processing.

"Threshold 2" is determined based on the value of the maximum angular velocity. For example, "Threshold 2" is found as "Threshold 2"=(Maximum Angular Velocity)×C, where C is experimentally determined from a value of 0 to 1, and desirably on the order of 0.1 in a normal case. In "Threshold 2", a previous angular velocity corresponding to a delay time from the time when a shot is detected to the time when a sound is emitted is assumed. This is because, due to the occurrence of a delay in wireless transmission or a delay in sound emission processing, which will be described further below, in order to compensate for the delay, a sound is emitted before timing at which a sound is supposed to be emitted. In general, it is assumed that the curve of the angular velocity of the shot is proportional to the intensity of a sound, and the threshold is determined based on the maximum value of the angular velocity.

When the drumstick section 10 is changed to be in a deceleration state (t3), the angular acceleration of the drumstick section 10 becomes 0 or smaller, and therefore the judgment result at Step S320 is NO. At Step S324, the CPU 11 compares an absolute value of the current angular velocity with "Threshold 2" to see whether the absolute value is smaller than "Threshold 2". While the drumstick is not being sufficiently decelerated, the judgment result at Step S324 is NO, and the CPU 11 ends the sound emission timing detection processing and wait for a shot timing.

If the drumstick has been decelerated sufficiently and the absolute value of the current angular velocity becomes smaller than "Threshold 2", the CPU 11 determines that shot timing is coming near, judges that the judgment result at Step S324 is YES (at a timing of t4), sets the motion state to SHOT (Step S325), and then initializes a shot passage time to 0 (Step S326). Then, the CPU 11 ends the sound emission timing detection processing. This SHOT state is to make a notification of sound emission timing, and is used to determine sound emission timing at Step S22 of FIG. 6.

When the motion state is SHOT, the CPU 11 updates the motion state to DONE at Step S330, and then ends the sound emission timing detection processing.

When the motion state is DONE, the CPU 11 judges whether the angular velocity is equal to or smaller than "Threshold 3" (Step S340). When judged that the angular velocity is equal to or smaller than "Threshold 3", the CPU 11 changes the motion state to IDLE (Step S341) and ends the sound emission timing detection processing. When judged that the angular velocity is larger than "Threshold 3" at Step S340, the CPU 11 judges whether the shot passage time is equal to or smaller than "Threshold 4" (Step S342). When judged that the shot passage time is equal to or smaller than "Threshold 4", the CPU 11 ends the sound emission timing detection processing. On the other hand, when judged that the shot passage time has exceeded "Threshold 4", the CPU 11 changes the motion state to IDLE (Step S341), and ends the sound emission timing detection processing.

That is, the DONE state is held until the angular velocity becomes equal to or smaller than "Threshold 3". This is to prevent an erroneous operation such as emission of a plurality of sounds at the time of stopping. However, if the angular velocity is gradually decelerated and the shot passage time until the angular velocity becomes equal to or smaller than "Threshold 3" exceeds "Threshold 4", the motion state is changed from DONE to IDLE.

[Sound Emission Timing Detection Processing (Second Example)]

FIG. 13 is a flowchart of sound emission timing detection processing in a second example.

First, the processing of the CPU 11 branches off according to the motion state (Step S352). There are four motion states: IDLE, ACTION, SHOT, and DONE. When the motion state is IDLE, the CPU 11 proceeds to Step S353. When the motion state is ACTION, the CPU 11 proceeds to Step S370. When the motion state is SHOT, the CPU 11 proceeds to Step S380. When the motion state is DONE, the CPU 11 proceeds to Step S390. Here, standard transitions of the motion state are similar to those of the first example as depicted in FIG. 14A to FIG. 14D.

When the angular acceleration of the drumstick section 10 is not positive, the CPU 11 ends the sound emission timing detection processing (Step S353). Even if the angular acceleration of the drumstick section 10 is positive, when the angular velocity of the drumstick section 10 is equal to or smaller than "Threshold 1", the CPU 11 ends the sound emission timing detection processing (Step S354). When the angular velocity of the drumstick section 10 exceeds "Threshold 1", the CPU 11 proceeds to Step S355 (Step S354). In FIG. 14A, the angular velocity exceeds "Threshold 1" at the time t2. At Step S355, the CPU 11 changes the motion state to ACTION (Step S355), and ends the sound emission timing detection processing.

When the motion state becomes ACTION, the drumstick continues accelerating for the time being, during which the angular acceleration is positive. Therefore, the CPU 11 judges that the judgment result at Step S370 is YES, and ends the sound emission timing detection processing.

When the drumstick section 10 is changed to be in a deceleration state (t3), the angular acceleration of the drumstick section 10 becomes 0 or smaller, and therefore the CPU 11 judges that the judgment result at Step S370 is NO. At Step S371, from a current drumstick tip angular velocity $\omega s_t$ and an angular acceleration $\delta \omega s_t$, the CPU 11 estimates a time when the angular velocity becomes 0. If an estimated time is taken as Trem, the above-described time can be estimated by using the following equation:

$$Trem = |\omega s_t| / |\delta \omega s_t|.$$

Subsequently, the CPU 11 judges whether the estimated time is equal to or smaller than "Threshold 5" (Step S372). For example, this "Threshold 5" is assumed to be on the order of 10 milliseconds.

This "Threshold 5" is set as a delay time from the time when a shot is detected to the time when a sound is emitted. This is because, due to the occurrence of a delay in wireless transmission or a delay in sound emission processing which will be described further below, a sound is emitted before timing at which a sound is supposed to be emitted, in order to compensate for the delay. Until the drumstick section 10 sufficiently decelerates, the CPU 11 judges that the judgment result at Step S372 is NO and ends the sound emission timing detection processing. After a while, when the angular velocity of the drumstick section 10 becomes near 0, the estimated time until the end (the angular velocity is 0) becomes equal to or smaller than "Threshold 5". Then, the CPU 11 judges that the judgment result at Step S372 is YES (at the timing of t4), sets the motion state to SHOT (Step S373), and initializes the SHOT passage time to 0 (Step S374). This SHOT state is to make a notification of sound emission timing, and is used to determine sound emission timing at Step S22 of FIG. 6.

When the motion state is SHOT, the CPU 11 updates the motion state to DONE at Step S380, and then ends the sound emission timing detection processing.

When the motion state is DONE, the CPU 11 judges whether the angular velocity is equal to or smaller than "Threshold 3" (Step S390). When judged that the angular velocity is equal to or smaller than "Threshold 3", the CPU 11 changes the motion state to IDLE (Step S391) and ends the sound emission timing detection processing. When judged at Step S390 that the angular velocity is larger than "Threshold 3", the CPU 11 determines whether the shot passage time is equal to or smaller than "Threshold 4" (Step S392). When judged that the shot passage time is equal to or smaller than "Threshold 4", the CPU 11 ends the sound emission timing detection processing. On the other hand, when judged that the shot passage time has exceeded "Threshold 4", the CPU 11 changes the motion state to IDLE (Step S391), and ends the sound emission timing detection processing.

That is, the DONE state is held until the angular velocity becomes equal to or smaller than "Threshold 3". This is to prevent an erroneous operation such as emission of a plurality of sounds at the time of stopping. However, if the angular velocity is gradually decelerated and the shot passage time until the angular velocity becomes equal to or smaller than "Threshold 3" exceeds "Threshold 4", the motion state is changed from DONE to IDLE.

[Sound Emission Amount Detection]

Figure 15:
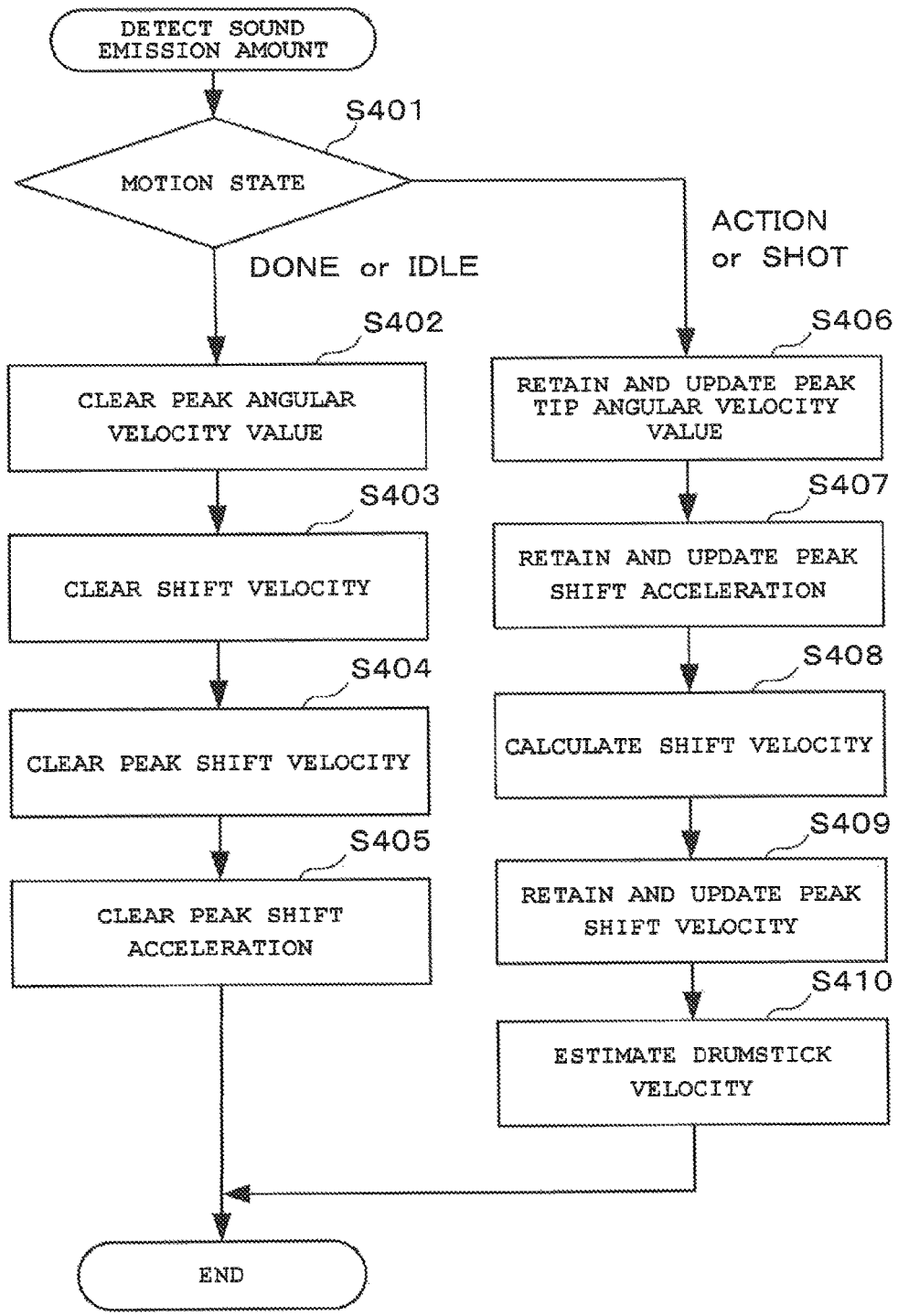
FIG. 15 is a flowchart of sound emission amount detection processing.

With reference to FIG. 15, the sound emission amount detection processing at Step S21 of FIG. 6 is described in detail.

FIG. 15 is a flowchart of the sound emission amount detection processing.

First, the CPU 11 determines the motion state. When the motion state is DONE or IDLE, the CPU 11 proceeds to Step S402. When the motion state is ACTION or SHOT, the CPU 11 proceeds to Step S406.

When the motion state is DONE or IDLE, the CPU 11 initializes a peak angular velocity value (a scalar quantity) $\omega_{s\ peak}$, a shift velocity $vs_t$, a peak shift velocity $vs_{peak}$, and a peak shift acceleration $as_{peak}$ to 0 (Steps S402 to S405).

The peak angular velocity value $\omega_{s\ peak}$ is a maximum value of the angular velocity detected while the drumstick is being swung for sound emission. The shift velocity $vs_t$ is a velocity component of translation of the tip of the drumstick. The current peak shift velocity $vs_{peak}$ is a value retaining a maximum value of a shift velocity $_LVs_t$. When the swing of the drumstick is detected in sound emission timing detection (Step S305 of FIG. 12) and the motion state becomes ACTION or SHOT, the CPU 11 compares a scalar quantity $|\omega_{st}|$ of the current angular velocity of the tip of the drumstick and the peak angular velocity value $\omega_{s\ peak}$ and, when $|\omega_{st}|$ is larger, the CPU 11 updates $\omega_{s\ peak}$ to $|\omega_{st}|$ (Step S406).

Next, the CPU 11 retains and updates the peak value $as_{peak}$ of the shift acceleration of the acceleration component $_LAs_t$ in the swing direction found at Step S212 of FIG. 10 (Step S407).

Subsequently, the CPU 11 finds an incomplete integral of the acceleration component $_LAs_t$ in the swing direction found at Step S212 of FIG. 10 to obtain the velocity $_LVs_t$ in the swing direction (Step S408).

Next, the CPU 11 compares the velocity $_LVs_t$ in the swing direction and the peak angular velocity value $vs_{peak}$ and, when $_LVs_t$ is larger, the CPU 11 updates $vs_{peak}$ to $_LVs_t$ (Step S409).

Next, the CPU 11 finds the velocity (sound volume) of the drumstick from three peak values by using, for example, a weighted addition as in the following Equation 5:

$$P_{shot}=a_1 \cdot \omega_{a\ peak}+a_2 \cdot vs_{peak}+a_3 \cdot as_{peak} \quad \text{Equation 5}$$

where $a_1$, $a_2$, and $a_3$ are mixing parameters and are determined by experiments.

$P_{shot}$ is used as a magnitude of a shot sound.

[Note Event Generation]

With reference to FIG. 16, the note event generation processing at Step S23 of FIG. 6 is described in detail.

FIG. 16 is a flowchart of the note event generation processing.

At the time of a shot, it is determined which sound of sound sources virtually arranged in a space is emitted. Since the shot timing is detected in advance in consideration of the delay in the system, the CPU 11 estimates the position of the drumstick section 10 when a sound is emitted (Step S501). Since the angular velocity and the angular acceleration of the tip of the drumstick section 10 are known, the CPU 11 can estimate the position by finding the orientation of the drumstick after Trem. Specifically, the CPU 11 further fragments Trem in time, takes a time interval therebetween as T, and finds an angular velocity at each time from the previous angular velocity vector and angular acceleration vector. Furthermore, with this angular velocity vector, the CPU 11 finds a rotation angle vector at each time interval, finds a resultant rotation matrix by using this rotation angle vector, and thereby predicts the next orientation. By repeating this to Trem, the orientation after Trem seconds can be predicted as $T_{L\rightarrow Wt+Trem}$. From the orientation parameter, it is possible to obtain a position $P_y=(P_{yX}P_{yY}P_{yZ})^T$ in the world coordinate system on the y axis in a direction of the tip of the drumstick section 10.

When six sound sources are mapped (placed) in the world coordinate system, the positions of the respective sound sources (the world coordinate system) are set as follows:

Sound Source 1: forward of (0, 1, 0)

Sound Source 2: in a direction at 60 degrees right forward of (sin 60, cos 60, 0)

Sound Source 3: in a direction at 60 degrees left forward of (−sin 60, cos 60, 0)

Sound Source 4: in a direction at 45 degrees up forward of (0, cos 45, sin 45)

Sound Source 5: in a direction at 60 degrees right forward and at 45 degrees upward of (cos 45 sin 60, cos 45 cos 60, sin 45)

Sound Source 6: in a direction at 60 degrees left forward and at 45 degrees upward of (−cos 45 sin 60, cos 45 cos 60, sin 45).

Positional information of the respective sound sources and timbres corresponding to the respective sound source numbers are stored in advance in the memory of the ROM 14.

The CPU 11 finds a distance between the position $P_y$ of the drumstick section 10 at sound emission estimated at Step S501 and the respective sound source positions $P_{si}=(P_{aiX}P_{aiY}P_{aiZ})^T$, and takes the nearest one as a sound source of a current shot target (Step S502).

In distance measurement, the CPU 11 calculates an Euclid distance. Alternatively, it is also effective to use a weighted Euclid distance for each component that is insensitive to a distance in a swing direction axis. Since the swing direction has low accuracy because the swing direction is a moving direction, it is desirable to use a distance weighted larger than the rotation axis direction.

Alternatively, the azimuth can be converted to be represented in pitch, yaw, roll angles. The positions of the sound sources and the position of the drumstick may be converted to be represented in angle representation to find each distance. Here, a distance with a weight varied between a pitch direction and a yaw direction may be used. The weight in a roll component is desirably 0.

Figure 17:
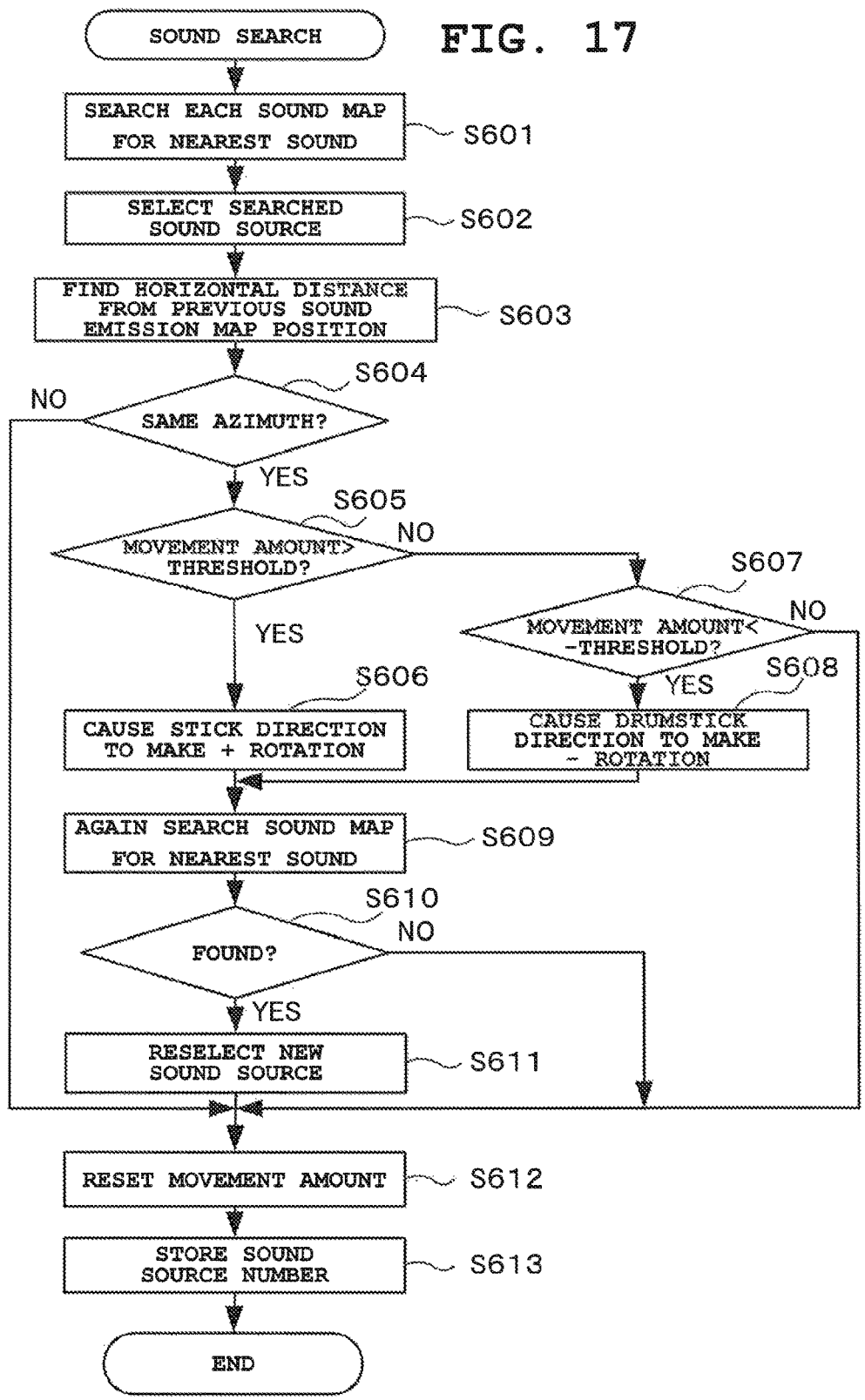
FIG. 17 is a flowchart of sound search processing in a modification example.

When the sound source number taken as a shot target at Step S502 or the sound source number determined in sound search processing, which will be described further below with reference to FIG. 17, is taken as i, the CPU 11 reads a note corresponding to an i-th sound source (Step S503), thereby obtaining a note for sound emission.

Next, the CPU 11 checks the yaw direction correction mode determined at Step S79 or S80 of FIG. 7 (Step S504). When the yaw direction correction mode is the geomagnetic mode, the CPU 11 ends the note even generation processing. On the other hand, when the yaw direction correction mode is the shot mode, the CPU 11 finds a yaw angle error formed by the sound source and the drumstick section 10 (Step S505). Specifically, the CPU 11 finds a direction vector of the drumstick from the orientation parameter and a direction vector of the sound source by using the position information of the sound source in the world coordinate system described above, and finds a difference of an angle of a vector formed of XY components of these two vectors as a yaw angle error. Since this yaw angle error is an error of rotation about the Z axis, the CPU 11 finds a rotation matrix with the Z axis as a rotation axis, and makes an orientation correction by using this rotation matrix (Step S506).

[Sound Search]

With reference to FIG. 17, sound search processing, which is a modification example of Step S502 of FIG. 16, is described in detail.

FIG. 17 is a flowchart of the sound search processing in the modification example of Step S502 of FIG. 16. This processing is performed in place of the processing at Step S502 of FIG. 16. That is, this processing is performed after the processing at Step S501 of FIG. 15 and, when Step S613 of the processing ends, the CPU 11 proceeds to Step S503 of FIG. 16.

First, the CPU 11 searches each sound map for the nearest sound source by using a sound search method similar to that at Step S502 of FIG. 16 (Step S601).

Next, the CPU 11 stores the found sound source number i in the RAM 15 as a current sound source selection number (Step S602). Subsequently, the CPU 11 reads the previous sound source number, and compares position coordinates of the sound source number with position coordinates of the current sound source. Here, the comparison is made in X and Y coordinates, excluding the Z axis in the vertical direction (Step S603). The vertical direction is not corrected in the present example.

Furthermore, the CPU 11 judges whether the sound sources are in the same azimuth (Step S604). When judged that they are in the same azimuth, the CPU 11 judges whether the horizontal component value of the movement amount found at S202 of FIG. 9 exceeds a predetermined positive threshold (Step S605). When the judgment result is YES, the CPU 11 causes the position $P_y$ in the direction of the tip of the drumstick section 10 to rotate in a positive direction by a predetermined rotation angle in the horizontal direction (Step S606). When the judgment result at Step S605 is NO, the CPU 11 compares a negative threshold obtained by multiplying the threshold by −1 and the horizontal component of the movement amount to judge whether the horizontal component is smaller than the negative threshold (Step S607). When the judgment result is YES, the CPU 11 causes the position $P_y$ in the direction of the tip of the drumstick section 10 to rotate in a negative direction by the predetermined rotation angle in the horizontal direction (Step S608).

The CPU 11 corrects the azimuth in the direction of the tip of the drumstick in the manner as described above to again find the nearest sound source from each sound map by using a sound search method similar to that at S502 of FIG. 16 (Step S609). The CPU 11 then judges whether a sound source has been found (Step S610). If a sound source has been found (when the judgment result at Step S610 is YES), the CPU 11 updates the newly found sound source with the current sound source number, and stores the sound source number in the RAM 15 (Step S611). If a sound source has not been found (when the judgment result at Step S610 is NO), the previous sound source number is retained.

Next, to find a movement amount between the next shot and the current shot, the CPU 11 resets the movement amount value to 0 (Step S612). Furthermore, the CPU 11 stores the currently adopted sound source number in the RAM 15 as the previous sound source number (Step S613).

[Sound Emission Processing]

Figure 18:
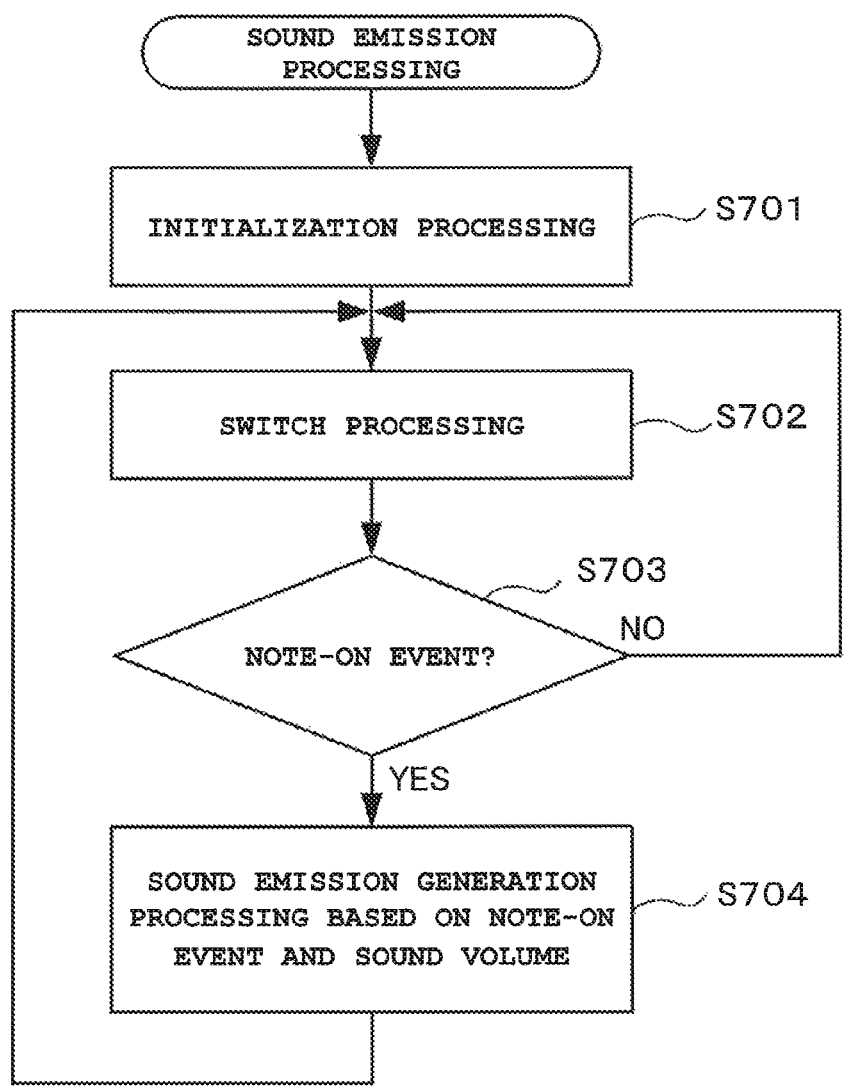
FIG. 18 is a flowchart of sound emission processing.

With reference to FIG. 18, sound emission processing to be performed by the sound emitting section 30 is described.

FIG. 18 is a flowchart of sound emission processing to be performed by the sound emitting section 30.

As depicted in FIG. 18, the CPU 31 of the sound emitting section 30 performs initialization processing including clearing the data in the RAM 34, clearing an image displayed on the screen of the display section 35, the sound source section 371, and the like, at power-up (Step S701). Next, the CPU 31 performs switch processing (Step S702). In the switch processing, for example, the CPU 31 specifies a sound volume value and a timbre desired by the instrument player according to a switch operation of the input section 36, and stores the specified value and timbre in the RAM 34.

Subsequently, the CPU 31 judges whether the I/F 32 has newly received a note-on event (Step S703). When the judgment result at Step S703 is YES, the CPU 31 performs processing for instructing the sound source section 371 to emit a musical sound with the set sound volume value and timbre based on the received note-on event (Step S704). When the processing at Step S704 ends, the CPU 31 returns to Step S702.

The structure and processing of the musical performance device 1 of the present embodiment have been described above.

In the present embodiment, the CPU 11 obtains the acceleration detected by the acceleration sensor 122 and the angular velocity detected by the angular velocity sensor 123 at every predetermined timing, and stores, in the RAM 15, an orientation parameter in an initial stationary state of the drumstick section 10, which includes the acceleration by gravity detected by the acceleration sensor 122 in the initial stationary state. Then, the CPU 11 updates the orientation parameter according to the angular velocity detected by the angular velocity sensor 123 at every predetermined timing, and calculates acceleration in a gravity direction from the detected acceleration based on the updated orientation parameter. Furthermore, the CPU 11 accumulates the calculated acceleration for each predetermined interval, and corrects the acceleration obtained by accumulation so that the acceleration conforms to the acceleration stored in the RAM 15.

Thus, when the drumstick section 10 is moved at high speed, accuracy in estimating the orientation of the drumstick section 10 can be improved by correcting the gravity direction.

Also in the present embodiment, in the initial stationary state of the drumstick section 10, the CPU 11 causes the magnetic sensor 121 to detect a geomagnetic component in each of directions of three axes orthogonal to each other including an axis in a longitudinal direction of the drumstick section 10, converts the detected geomagnetic components to geomagnetic components in directions of other three axes based on the orientation parameter described above, and stores the components obtained by conversion in the RAM 15. Then, the CPU 11 obtains the geomagnetic components of the respective axes detected by the magnetic sensor 121 at every predetermined timing and, based on the orientation parameter, converts the geomagnetic components of the respective axes obtained at every predetermined timing to geomagnetic components in the directions of different three axes described above. Furthermore, the CPU 11 accumulates the geomagnetic components obtained by conversion for each predetermined interval, and corrects each geomagnetic component obtained by accumulation so that the geomagnetic component conforms to the geomagnetic component stored in the RAM 15.

Thus, when the drumstick section 10 is moved at high speed, accuracy in estimating the orientation of the drumstick section 10 can be improved by correcting the geomagnetic direction.

Furthermore, in the present embodiment, after the angular velocity value obtained by the angular velocity sensor 123 exceeds "Threshold 1" and then becomes below "Threshold 2", the CPU 11 transmits a note-on event to the sound emitting section 30. "Threshold 2" is a value according to the maximum value after the angular velocity value obtained by the angular velocity sensor 123 exceeds "Threshold 1"

(specifically, a value obtained by multiplying the maximum value by a predetermined ratio value).

Thus, accuracy in sound emission can be improved by generating sound emission timing at a predetermined time ahead of the original shot timing, in consideration of a sound emission delay time.

Still further, in the present embodiment, the CPU 11 estimates a time until the angular velocity becomes 0 after the value of the angular velocity obtained by the angular velocity sensor 123 exceeds "Threshold 1" and, when the estimated time becomes below "Threshold 5", transmits a note-on even to the sound emitting section 30.

Thus, accuracy in sound emission can be improved by generating sound emission timing at a predetermined time ahead of the original shot timing, in consideration of a sound emission delay time.

Yet still further, in the present embodiment, the CPU 11 calculates the angular velocity and the angular acceleration of the tip of the drumstick section 10 based on the angular velocity obtained by the angular velocity sensor 123, and estimates a time until the value of the angular velocity becomes 0 after the value of the angular velocity obtained by the angular velocity sensor 123 exceeds "Threshold 1", based on the calculated angular velocity and angular acceleration of the tip of the drumstick section 10.

Thus, accuracy in estimating the time until the angular velocity value becomes 0 can be improved.

Yet still further, in the present embodiment, the CPU 11 estimates the rotation axis direction of the drumstick section 10 during musical performance based on the angular velocity obtained by the angular velocity sensor 123, calculates the angular velocity of the tip of the drumstick section 10 based on the angular velocity obtained by excluding an axis component in the longitudinal direction of the drumstick section 10 from the angular velocity obtained by the angular velocity sensor 123, and calculates the position of the drumstick section 10 in the world coordinate system after a predetermined time based on the estimated latest rotation axis direction and the calculated latest angular velocity of the tip of the drumstick section 10. Of the plurality of areas of the sound source map, the CPU 11 transmits a note-on event of a musical sound corresponding to the area nearest to the calculated position to the sound emitting section 30.

Thus, even if the drumstick section 10 is diagonally swung, the timbre at the position of the drumstick section 10 can be emitted at the original shot timing.

Still further, in the present embodiment, the CPU 11 estimates the rotation axis direction of the drumstick section 10 during musical performance based on the angular velocity obtained by the angular velocity sensor 123, and calculates the angular velocity of the tip of the drumstick section 10 based on angular velocity obtained by excluding an axial component in a longitudinal direction of the drumstick section 10 from the angular velocity obtained by the angular velocity sensor 123. Based on the estimated latest rotation axis direction and the calculated latest angular velocity of the tip of the drumstick section 10, the CPU 11 calculates the position of the drumstick section 10 in the world coordinate system after a predetermined time, calculates a movement distance based on the acceleration obtained by the acceleration sensor 122, and corrects the position of the drumstick section 10 in the world coordinate system after a predetermined time based on the calculated position and the calculated movement distance. Then, of the plurality of areas of the sound source map, the CPU 11 transmits a note-on event of a musical sound corresponding to the area nearest to the corrected position to the sound emitting section 30.

Thus, even if the drumstick section 10 is diagonally swung and is subjected to translation, a sound can be emitted with a timbre at the position of the drumstick section 10 at the original shot timing.

Yet still further, in the present embodiment, the CPU 11 calculates a maximum value of the angular velocity of the drumstick section 10 during musical performance based on the angular velocity obtained by the angular velocity sensor 123, calculates a maximum of acceleration of the drumstick section 10 during musical performance based on the acceleration obtained by the acceleration sensor 122, and control the sound volume of the musical sound to be emitted based on the calculated maximum value of the angular velocity and the maximum value of the acceleration.

Thus, even if a virtual sound source is placed vertically to the world coordinate system, appropriate sound volume control can be performed by reflecting the strength of the swing motion.

While the present invention has been described with reference to the preferred embodiments, it is intended that the invention be not limited by any of the details of the description therein but includes all the embodiments which fall within the scope of the appended claims.

What is claimed is:

1. An orientation detection device control method performed by an orientation detection device that can be held by a user, the orientation detection device comprising a housing member to be held by the user, a triaxial magnetic sensor housed in the housing member, and an angular velocity sensor housed in the housing member, the method comprising:

storing, in a memory, an orientation parameter of the orientation detection device, wherein the orientation parameter is indicated by pitch, yaw, and roll in a coordinate system based on a direction of geomagnetism;

successively detecting vectors of angular velocity by the angular velocity sensor provided in the orientation detection device;

successively updating the orientation parameter stored in the memory according to the vectors of angular velocity successively detected by the angular velocity sensor, wherein the updating is performed a plurality of times without correcting the direction of geomagnetism;

successively detecting a vector of magnetism occurring in each direction of three axes of the orientation detection device which are orthogonal to each other by the triaxial magnetic sensor provided in the orientation detection device;

obtaining the direction of geomagnetism by accumulating a plurality of vectors of magnetism successively detected by the triaxial magnetic sensor;

successively correcting the updated orientation parameter stored in the memory by correcting the direction of geomagnetism of the coordinate system according to the direction of geomagnetism obtained, wherein the correcting is performed by correcting a shift of the direction of geomagnetism that is successively accumulated by the updating;

determining a position of the orientation detection device in the coordinate system, based on the orientation parameters that are successively corrected; and controlling, based on the determined position of the orientation detection device in the coordinate system, at least one of (i) a timing at which information that is perceivable by the user holding the orientation detection device is output, and (ii) selection of a type of the information which is output and is perceivable by the user, wherein selection of the type of the information which is output is performed by comparing the determined position of the orientation detection device in the coordinate system with a plurality of predetermined positions in the coordinate system which are stored in advance in the memory, and selecting the type of the information which is output based on a result of the comparison.

2. The orientation detection device control method according to claim 1, further comprising:
successively correcting the updated orientation parameter stored in the memory by successively correcting the direction of geomagnetism of the coordinate system according to the direction of geomagnetism successively obtained by the triaxial magnetic sensor.

3. The orientation detection device control method according to claim 1, wherein the coordinate system is based on a direction of gravity; and
wherein the method further comprises:
obtaining a direction of gravity by accumulating a plurality of vectors successively detected by an acceleration sensor provided in the device; and
successively correcting the updated orientation parameter by correcting the direction of gravity of the coordinate system according to a direction of gravity obtained using the acceleration sensor.

4. An orientation detection device comprising:
the housing member;
the angular velocity sensor;
the triaxial magnetic sensor; and
a processor which executes the orientation detection device control method according to claim 1.

5. The orientation detection device control method according to claim 1, further comprising:
judging whether or not the device is in a stationary state on condition that there is no change in vectors of acceleration detected by an acceleration sensor provided in the orientation detection device;
initializing the orientation parameter at a timing at which it is judged that the device is in the stationary state, wherein the initializing includes initializing the direction of geomagnetism in the coordinate system; and
successively correcting the updated orientation parameter, wherein the correcting includes correcting the direction of geomagnetism in the coordinate system, and wherein the correcting is successively performed at a timing at which it is not judged whether or not the device is in the stationary state.

6. The orientation detection device control method according to claim 1, wherein emission of a musical sound is controlled based on the orientation parameter.

7. The orientation detection device control method according to claim 6, wherein a position of the orientation detection device is specified based on vectors of acceleration obtained by an acceleration sensor provided in the device, and content of the musical sound to be emitted is controlled based on the specified position of the device.

8. The orientation detection device control method according to claim 6, wherein a movement velocity of a portion of the device is specified based on the vectors of angular velocity obtained by the angular velocity sensor, and a timing of emitting the musical sound is controlled based on the specified movement velocity.

9. The orientation detection device control method according to claim 6, wherein a movement velocity of a portion of the orientation detection device is specified based on the vectors of angular velocity obtained by the angular velocity sensor, and a sound volume of the musical sound to be emitted is controlled based on the specified movement velocity.

10. An orientation detection device comprising:
the housing member;
the triaxial magnetic sensor;
the angular velocity sensor;
the memory; and
a processor which is configured to control the orientation detection device to perform the orientation detection device control method according to claim 1.

11. The orientation detection device control method according to claim 1,
wherein the information that is perceivable by the user is a musical sound, and
wherein an output state of the musical sound is controlled based on the orientation parameters that are successively corrected.

12. The orientation detection device control method according to claim 11, wherein the output state of the musical sound is a timbre and pitch of the musical sound.

13. The orientation detection device control method according to claim 1, wherein a correspondence relationship between a respective plurality of different orientation parameters and respective plural pieces of different output information is stored in advance, and a piece of output information to be changed corresponding to the orientation parameters that are successively corrected is determined based on the correspondence relationship.

14. The orientation detection device control method according to claim 12, wherein a correspondence relationship between a respective plurality of different orientation parameters and a respective plurality of musical sounds is stored in advance, and a musical sound to be changed is determined based on the correspondence relationship.

* * * * *